United States Patent
Mohammed et al.

(10) Patent No.: US 12,532,143 B2
(45) Date of Patent: Jan. 20, 2026

(54) DYNAMIC AUDIO SPATIALIZATION

(71) Applicant: QUALCOMM Incorporated, San Diego, CA (US)

(72) Inventors: Rashed Mohammed, Hyderabad (IN); Preetam Singh Ranawat, Hyderabad (IN); Krithi Aiyappa, Hyderabad (IN); Prakash Katragadda, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 241 days.

(21) Appl. No.: 18/325,486

(22) Filed: May 30, 2023

(65) Prior Publication Data

US 2024/0406665 A1   Dec. 5, 2024

(51) Int. Cl.
| | |
|---|---|
| H04S 7/00 | (2006.01) |
| G06T 7/70 | (2017.01) |
| H04R 5/033 | (2006.01) |
| H04R 5/04 | (2006.01) |
| H04S 3/00 | (2006.01) |

(52) U.S. Cl.
CPC ............... *H04S 7/304* (2013.01); *G06T 7/70* (2017.01); *H04R 5/033* (2013.01); *H04R 5/04* (2013.01); *H04S 3/008* (2013.01); *G06T 2207/30196* (2013.01); *H04R 2420/07* (2013.01); *H04R 2499/13* (2013.01); *H04S 2400/01* (2013.01); *H04S 2400/11* (2013.01); *H04S 2400/13* (2013.01)

(58) Field of Classification Search
None
See application file for complete search history.

(56) References Cited

U.S. PATENT DOCUMENTS

| | | | |
|---|---|---|---|
| 10,349,201 B2 * | 7/2019 | Baek | H04S 1/002 |
| 2008/0008342 A1 * | 1/2008 | Sauk | H04S 1/002 |
| | | | 381/315 |
| 2015/0230040 A1 | 8/2015 | Squires et al. | |
| 2016/0227338 A1 * | 8/2016 | Oh | H04S 3/008 |
| 2018/0091922 A1 | 3/2018 | Satongar et al. | |
| 2019/0069114 A1 | 2/2019 | Tai et al. | |
| 2019/0268711 A1 | 8/2019 | Moeller | |

(Continued)

FOREIGN PATENT DOCUMENTS

WO   WO-2022227921 A1 *   11/2022   ............. H04S 7/306

OTHER PUBLICATIONS

English Language Translation for WO 2022/227921 A1, pp. 1-18. (Year: 2022).*

(Continued)

*Primary Examiner* — Paul W Huber
(74) *Attorney, Agent, or Firm* — QUALCOMM Incorporated; Espartaco Diaz Hidalgo

(57) ABSTRACT

A device includes one or more processors configured to obtain, based on a wireless transmission from an audio headset, location data indicative of a location of the audio headset relative to the device. The one or more processors are configured to adjust one or more gain values associated with one or more channels of a virtual speaker array to generate adjusted spatial audio data that emulates positioning of the audio headset relative to the virtual speaker array based on the location data. The one or more processors are also configured to send audio data corresponding to the adjusted spatial audio data to the audio headset.

30 Claims, 12 Drawing Sheets

(56) References Cited

U.S. PATENT DOCUMENTS

| | | | |
|---|---|---|---|
| 2019/0357000 A1 | 11/2019 | Karkkainen et al. | |
| 2020/0007988 A1 | 1/2020 | Raj | |
| 2022/0240018 A1* | 7/2022 | Hsieh | H04L 1/189 |
| 2022/0360933 A1 | 11/2022 | Faaborg et al. | |
| 2024/0056762 A1* | 2/2024 | Lian | H04R 5/033 |

OTHER PUBLICATIONS

International Search Report and Written Opinion—PCT/US2024/030571—ISA/EPO—Sep. 26, 2024.

* cited by examiner

DYNAMIC AUDIO SPATIALIZATION

I. FIELD

The present disclosure is generally related to dynamic audio spatialization.

II. Description of Related Art

Advances in technology have resulted in smaller and more powerful computing devices. For example, there currently exist a variety of portable personal computing devices, including wireless telephones such as mobile and smart phones, tablets and laptop computers that are small, lightweight, and easily carried by users. These devices can communicate voice and data packets over wireless networks. Further, many such devices incorporate additional functionality such as a digital still camera, a digital video camera, a digital recorder, and an audio file player. Also, such devices can process executable instructions, including software applications, such as a web browser application, that can be used to access the Internet. As such, these devices can include significant computing capabilities.

Such computing devices, such as headset devices, often incorporate functionality to receive and play out an audio signal from a streaming audio source. For example, the audio signal can include a spatial audio signal configured to emulate the acoustic interaction between a listener and a traditional surround sound audio configuration. While such an audio signal can emulate a surround sound configuration with the user at the center of a surround sound configuration, certain configurations of spatial audio may not be able to account for a user's movement relative to the streaming audio source.

III. SUMMARY

According to one implementation of the present disclosure, a device includes one or more processors configured to obtain, based on a wireless transmission from an audio headset, location data indicative of a location of the audio headset relative to the device. The one or more processors can also be configured to adjust one or more gain values associated with one or more channels of a virtual speaker array to generate adjusted spatial audio data that emulates positioning of the audio headset relative to the virtual speaker array based on the location data. The one or more processors can also be configured to send audio data corresponding to the adjusted spatial audio data to the audio headset.

According to another implementation of the present disclosure, a method includes obtaining, at one or more processors and based on a wireless transmission from an audio headset, location data indicative of a location of the audio headset relative to a computing device. The method can also include adjusting, at the one or more processors, one or more gain values associated with one or more channels of a virtual speaker array to generate adjusted spatial audio data that emulates positioning of the audio headset relative to the virtual speaker array based on the location data. The method can also include sending audio data corresponding to the adjusted spatial audio data to the audio headset.

According to another implementation of the present disclosure, a non-transitory computer-readable medium includes instructions that, when executed by one or more processors, cause the one or more processors to obtain, based on a wireless transmission from an audio headset, location data indicative of a location of the audio headset relative to the device. The instructions can also cause the one or more processors to adjust one or more gain values associated with one or more channels of a virtual speaker array to generate adjusted spatial audio data that emulates positioning of the audio headset relative to the virtual speaker array based on the location data. The instructions can also cause the one or more processors to send audio data corresponding to the adjusted spatial audio data to the audio headset.

According to another implementation of the present disclosure, an apparatus includes means for obtaining, at one or more processors and based on a wireless transmission from an audio headset, location data indicative of a location of the audio headset relative to a computing device. The device can also include means for adjusting, at the one or more processors, one or more gain values associated with one or more channels of a virtual speaker array to generate adjusted spatial audio data that emulates positioning of the audio headset relative to the virtual speaker array based on the location data. The device can also include means for sending audio data corresponding to the adjusted spatial audio data to the audio headset.

According to another implementation of the present disclosure, a headset device includes one or more processors configured to determine location data indicative of a location of the headset device relative to a streaming source. The one or more processors can also be configured to receive spatial audio data from the streaming source. The one or more processors can also be configured to adjust one or more gain values associated with one or more channels of a virtual speaker array to generate adjusted spatial audio data from the spatial audio data, the one or more gain values emulating a position of the headset device relative to the virtual speaker array based on the location data. The one or more processors can also be configured to generate binaural audio data corresponding to the adjusted spatial audio data for playout at earphone speakers.

According to another implementation of the present disclosure, a method includes determining location data indicative of a location of the headset device relative to a streaming source. The method can also include receiving spatial audio data from the streaming source. The method can also include adjusting one or more gain values associated with one or more channels of a virtual speaker array to generate adjusted spatial audio data from the spatial audio data, the one or more gain values emulating a position of the headset device relative to the virtual speaker array based on the location data. The method can also include generating binaural audio data corresponding to the adjusted spatial audio data for playout at earphone speakers.

According to another implementation of the present disclosure, a non-transitory computer-readable medium includes instructions that, when executed by one or more processors, cause the one or more processors to determine location data indicative of a location of the headset device relative to a streaming source. The instructions can also cause the one or more processors to receive spatial audio data from the streaming source. The instructions can also cause the one or more processors to adjust one or more gain values associated with one or more channels of a virtual speaker array to generate adjusted spatial audio data from the spatial audio data, the one or more gain values emulating a position of the headset device relative to the virtual speaker array based on the location data. The instructions can also cause the one or more processors to generate binaural audio data corresponding to the adjusted spatial audio data for playout at earphone speakers.

According to another implementation of the present disclosure, a device includes means for determining location data indicative of a location of the headset device relative to a streaming source. The device can also include means for receiving spatial audio data from the streaming source. The device can also include means for adjusting one or more gain values associated with one or more channels of a virtual speaker array to generate adjusted spatial audio data from the spatial audio data, the one or more gain values emulating a position of the headset device relative to the virtual speaker array based on the location data. The device can also include means for generating binaural audio data corresponding to the adjusted spatial audio data for playout at earphone speakers.

Other aspects, advantages, and features of the present disclosure will become apparent after review of the entire application, including the following sections: Brief Description of the Drawings, Detailed Description, and the Claims.

IV. BRIEF DESCRIPTION OF THE DRAWINGS

V. DETAILED DESCRIPTION

Figure 1:
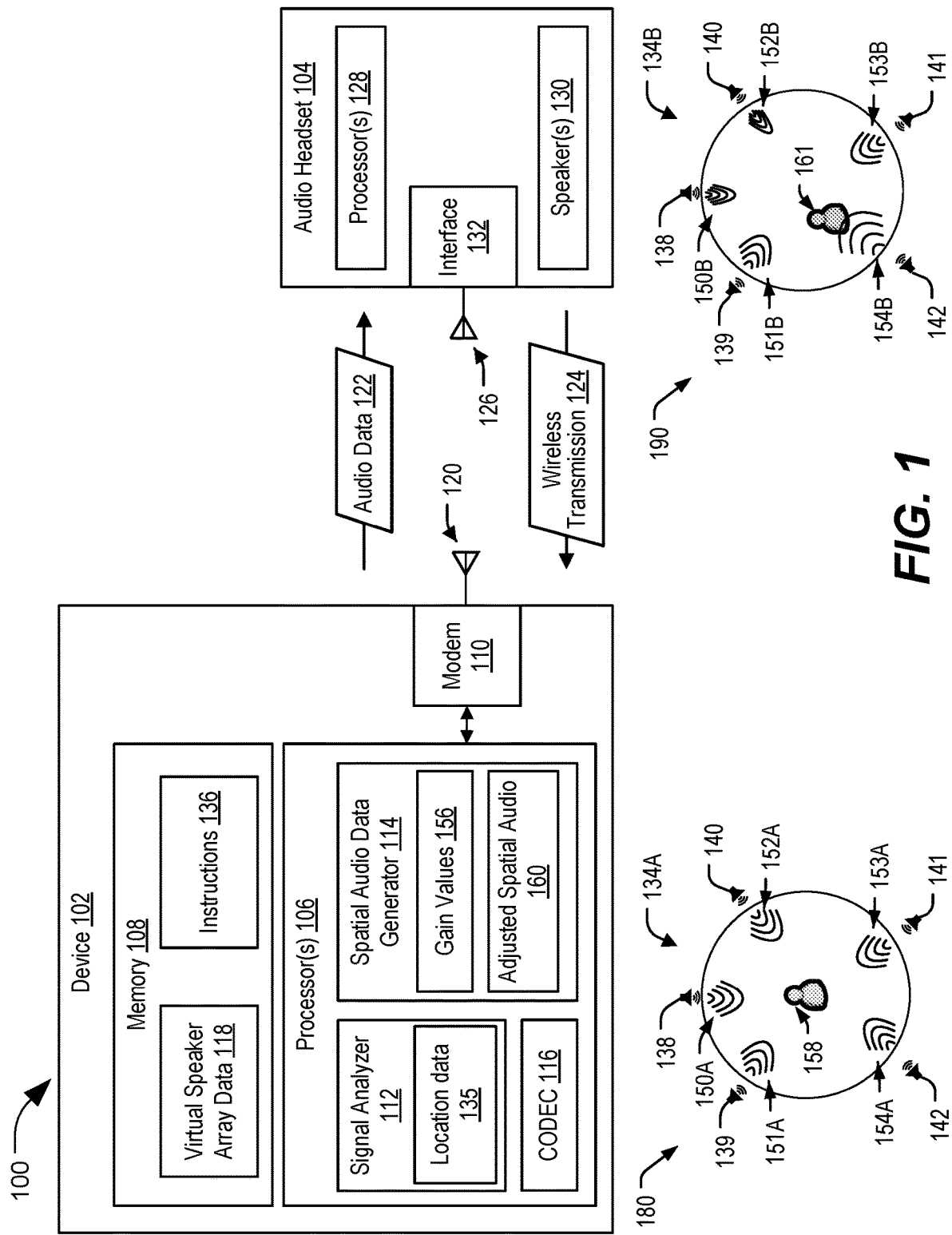
FIG. 1 is a block diagram of an example of a system that includes a device configured to provide dynamic audio spatialization, in accordance with some examples of the subject disclosure.

Aspects disclosed herein present systems and methods for dynamic audio spatialization. Conventional approaches to providing spatial audio can ignore changing distance between a streaming source and a headset in accounting for sound intensity. Thus, a user can get the same spatial audio experience regardless of distance between the user and the streaming source. By analyzing a wireless signal between the headset and the streaming source to estimate a location of the headset relative to the streaming source, the present systems and methods enable dynamic audio spatialization that accounts for a user's movement relative to a streaming audio source while maintaining an emulation of the acoustic interaction between a listener and a traditional surround sound audio configuration.

For the purposes of the present disclosure, "spatial audio" or "spatialized audio" is a technology used to create a sound field surrounding the listener, enabling the listener to perceive channels and individual sounds in positions that differ from the physical positions of the transducers of the audio device used for playback. For instance, spatial audio offers the user the ability to listen to a multichannel soundtrack over headphones in a three-dimensional perception (as if it is coming from the several directions) and can let the user feel the variation in volume with respect to the source.

Systems and methods of dynamic audio spatialization are disclosed, for example, in which one or more processors can determine location data indicative of a location of an audio headset relative to a streaming source. The processor(s) can adjust one or more gain values associated with one or more channels of a virtual speaker array to generate adjusted spatial audio data from spatial audio data from the streaming source, where the one or more gain values emulates a position of the audio headset relative to the virtual speaker array based on the location data. The processor(s) can also generate binaural audio data corresponding to the adjusted spatial audio data for playout at a speaker.

In a particular aspect, the processor(s) can use a BLUETOOTH® Low Energy wireless signal from an audio headset, to estimate an angle of the audio headset with respect to a streaming source. BLUETOOTH® is a registered trademark of Bluetooth SIG, Inc., a Delaware Corporation. Additionally, the wireless signal can include a received signal strength indicator ("RSSI") from the wireless signal to estimate a distance between the audio headset and the streaming source. By combining the angle of arrival and signal strength (e.g., RSSI) levels, the processor(s) can generate a relatively accurate position of the audio headset relative to the streaming source.

Once a location of the audio headset is determined, the processor(s) can change one or more gains of a virtual speaker array so that the volume gain of the virtual speaker(s) to which the audio headset is nearer can be increased whereas the volume gain of the virtual speaker(s) the audio headset is farther from can be proportionally reduced. The processor(s) can then render audio objects binaurally with different intensity level(s) where the gain level for each virtual audio source can be changed based on the audio headset's position relative to the streaming source.

Particular aspects of the present disclosure are described below with reference to the drawings. In the description, common features are designated by common reference numbers. As used herein, various terminology is used for the purpose of describing particular implementations only and is not intended to be limiting of implementations. For example, the singular forms "a," "an," and "the" are intended to include the plural forms as well, unless the context clearly indicates otherwise. Further, some features described herein are singular in some implementations and plural in other implementations. To illustrate, FIG. 1 depicts a device 102 including one or more processors ("processor(s)" 106 of FIG. 1), which indicates that in some implementations the device 102 includes a single processor 106 and in other implementations the device 102 includes multiple processors 106. For ease of reference herein, such features are generally introduced as "one or more" features and are subsequently referred to in the singular unless aspects related to multiple of the features are being described.

In some drawings, multiple instances of a particular type of feature are used. Although these features are physically and/or logically distinct, the same reference number is used for each, and the different instances are distinguished by addition of a letter to the reference number. When the features as a group or a type are referred to herein e.g., when no particular one of the features is being referenced, the reference number is used without a distinguishing letter. However, when one particular feature of multiple features of the same type is referred to herein, the reference number is used with the distinguishing letter. For example, referring to FIG. 1, multiple intensity levels are illustrated and associated with reference numbers 150A and 150B. When referring to a particular one of these intensity levels, such as an intensity level 150A, the distinguishing letter "A" is used. However, when referring to any arbitrary one of these intensity levels or to these intensity levels as a group, the reference number 150 is used without a distinguishing letter.

As used herein, the terms "comprise," "comprises," and "comprising" may be used interchangeably with "include," "includes," or "including." Additionally, the term "wherein" may be used interchangeably with "where." As used herein, "exemplary" indicates an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to one or more of a particular element, and the term "plurality" refers to multiple (e.g., two or more) of a particular element.

As used herein, "coupled" may include "communicatively coupled," "electrically coupled," or "physically coupled," and may also (or alternatively) include any combinations thereof. Two devices (or components) may be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled may be included in the same device or in different devices and may be connected via electronics, one or more connectors, or inductive coupling, as illustrative, non-limiting examples. In some implementations, two devices (or components) that are communicatively coupled, such as in electrical communication, may send and receive signals (e.g., digital signals or analog signals) directly or indirectly, via one or more wires, buses, networks, etc. As used herein, "directly coupled" may include two devices that are coupled (e.g., communicatively coupled, electrically coupled, or physically coupled) without intervening components.

In the present disclosure, terms such as "determining," "calculating," "estimating," "shifting," "adjusting," etc. may be used to describe how one or more operations are performed. It should be noted that such terms are not to be construed as limiting and other techniques may be utilized to perform similar operations. Additionally, as referred to herein, "generating," "calculating," "estimating," "using," "selecting," "accessing," and "determining" may be used interchangeably. For example, "generating," "calculating," "estimating," or "determining" a parameter (or a signal) may refer to actively generating, estimating, calculating, or determining the parameter (or the signal) or may refer to using, selecting, or accessing the parameter (or signal) that is already generated, such as by another component or device.

FIG. 1 is a block diagram of an example of a system 100 that includes a device 102 configured to provide dynamic audio spatialization, in accordance with some examples of the subject disclosure. The device 102 includes one or more processors 106 coupled to a memory 108. The one or more processors 106 include a signal analyzer 112, a spatial audio data generator 114, and a codec 116. The memory 108 stores instructions 136 for execution by the processor(s) 106 to provide functionality as described below for the signal analyzer 112, the spatial audio data generator 114, the codec 116, or a combination thereof. In some implementations, the device 102 corresponds to a television, a mobile phone, or a tablet computing device, as illustrative, non-limiting examples.

The device 102 also includes an antenna 120 coupled to the processor(s) 106 via a modem 110. The device 102 is configured to determine a location of an audio headset 104 relative to the device 102 based on wireless signaling received from the audio headset 104. The device 102 adjusts spatial audio data to be transmitted to the audio headset 104 for playout so that changes in the location of the audio headset 104 result in corresponding changes to the spatial audio data in order to emulate positioning of the audio headset 104 relative to a virtual speaker array. The device 102 is configured to send audio data 122 corresponding to the adjusted spatial audio data 160 to the audio headset 104 for playout to a user (e.g., a wearer) of the audio headset 104.

The audio headset 104 includes one or more processors 128 coupled to one or more speakers 130 and also coupled to an antenna 126 via a wireless interface 132. According to some implementations, the audio headset 104 includes, for example, headphones (wired, wireless, etc.), another electronic device, a portable speaker, an electronic device configured to output audio (e.g., an electronic device incorporated into another device, such as a vehicle; an augmented reality, virtual reality, and/or extended reality device; a smart speaker; a camera; a wearable electronic device; a television, etc.), or some combination thereof.

The processor(s) 128 can be configured to generate a signal for transmission to the device 102 via the antenna 126. The antenna 126 can be configured to transmit the wireless transmission 124 based at least on the signal received from the processor(s) 128 via the wireless interface 132. In some aspects, the wireless transmission 124 can be a wireless radio signal, infrared signal, etc. configured to provide location data 135 from the audio headset 104 to the device 102. For example, the wireless transmission 124 can include a BLUETOOTH® Low Energy signal.

In some implementations, the speaker(s) 130 are configured to output an audio signal associated with audio data 122, which is received at the audio headset 104 via the antenna 126 from the device 102. For example, the device 102 can communicate audio data 122 associated with streaming audio (e.g., voice, music, other audio content, or some combination thereof). The audio data 122 can be received at the antenna 126 and communicated to the speaker(s) 130 and/or the processor(s) 128 via the wireless interface 132. In a particular aspect, the wireless interface 132 can include a codec configured to decode the audio data 122 for playback at the speaker(s) 130. In other configurations, the codec can be included at the processor(s) 128, part of another component of the audio headset 104, a separate component of the audio headset 104, or some combination thereof.

The wireless transmission 124 is received at the antenna 120 of the device 102. According to an aspect, the antenna 120 includes one or more antenna elements. For example, the antenna 120 can correspond to an antenna array coupled to the processor(s) 106 and configured to receive the wireless transmission 124 from the audio headset 104. Data associated with the wireless transmission 124 can be communicated to the processor(s) 106 via the modem 110.

The processor(s) 106 are configured to obtain, based on the wireless transmission 124 from the audio headset 104, the location data 135 indicative of the location of the audio headset 104 relative to the device 102. For example, in some aspects, the signal analyzer 112 is configured to analyze the wireless transmission 124 to obtain the location data 135 from the data associated with the wireless transmission 124.

According to some aspects, the location data 135 includes angle data indicative of an angle of the audio headset 104 relative to the device 102. In an example, the angle data includes an angle of arrival of the wireless transmission 124 from the audio headset 104 to the device 102. In the same or alternative aspects, the location data 135 includes distance data indicative of a linear distance between the audio headset 104 and the device 102. In a particular implementation, the distance data is based at least on a signal strength measurement of the wireless transmission 124 from the audio headset 104 to the device 102. For example, in an implementation in which the wireless transmission 124 includes a BLUETOOTH® Low Energy signal, the signal analyzer 112 is configured to analyze the wireless transmission 124 to determine an angle of arrival of the wireless transmission 124 from the audio headset 104 to the device 102, a linear distance between the audio headset 104 and the device 102, one or more other appropriate location measures, or some combination thereof.

In a particular aspect, the antenna 120 can enable determination, by the processor(s) 106, the angle of arrival of the wireless transmission 124. As described in more detail below with reference to FIG. 3, for example, the device 102 can use a plurality of antennas 120 to determine an angle of arrival of the wireless transmission 124 and also to generate an approximation of the distance between the audio headset 104 and the device 102 using a received signal strength indicator measurement of the wireless transmission 124. According to some aspects, the device 102 includes a BLUETOOTH® Low Energy-type receiver, and the location data 135 is based on at least one of the angle of arrival or the received signal strength indicator that corresponds to the wireless transmission and that is obtained from the BLUETOOTH® Low Energy-type receiver.

In some implementations, the spatial audio data generator 114 of the processor(s) 106 is configured to adjust one or more gain values 156 associated with one or more channels of a virtual speaker array 134 to generate adjusted spatial audio that emulates positioning of the audio headset 104 relative to the virtual speaker array 134 based on the location data 135. The virtual speaker array 134 is a virtual configuration of a plurality of virtual speakers. For the purposes of the subject disclosure, a virtual speaker in the virtual speaker array 134 represents a virtual sound source and is also referred to a "channel."

For example, a first graphical representation 180 depicts a virtual speaker array 134A corresponding to the virtual speaker array 134 at a first time, and a second graphical representation 190 depicts a virtual speaker array 134B corresponding to the virtual speaker array 134 at a second time. As depicted in the graphical representations 180 and 190, the virtual speaker array 134 includes a plurality of virtual speakers in a particular configuration that includes channels 138, 139, 140, 141, and 142. The channel 138 can correspond to a front center virtual speaker (e.g., a location of the device 102 or a display device), the channel 139 corresponds to a front left virtual speaker, the channel 140 corresponds to a front right virtual speaker, the channel 142 correspond to rear right virtual speaker, and the channel 143 corresponds to a rear left virtual speaker. Data representative of the configuration of the plurality of channels constituting the virtual speaker array 134 can be stored as virtual speaker array data 118 at the memory 108. Although a particular configuration of a five-channel virtual speaker array 134 is illustrated, in other implementations the virtual speaker array 134 can have fewer than five channels or more than five channels, a different arrangement of the virtual speakers, or any combination thereof.

In some aspects, each channel of the virtual speaker array 134 can have an associated gain value (e.g., the gain values 156). A gain value associated with a particular channel can modify an intensity of an audio signal associated with the particular channel. For example, the virtual speaker array 134A illustrates the exemplary virtual speaker array 134 at the first time. The channels 138-142 of the virtual speaker array 134A have associated levels (also referred to as "intensities") 150A, 151A, 152A, 153A, and 154A, respectively, which are graphically represented as sets of sound waves that emanate from the respective virtual speakers.

By modifying the gain values 156, the spatial audio data generator 114 can modify the intensities associated with each channel of the virtual speaker array. For example, the virtual speaker array 134B illustrates the exemplary virtual speaker array 134 at the second time. The channels 138-142 of the virtual speaker array 134B have associated intensities 150B, 151B, 152B, 153B, and 154B, respectively. In the illustrative example of FIG. 1, the channels 138 and 140 have lower intensities 150B, 152B (depicted as smaller sets of sound waves) at the second time as compared to the channels 138, 140 with intensities 150A, 152A at the first time. Similarly, the channel 142 has a higher intensity 154B (depicted as a larger set of sound waves) at the second time as compared to channel 142 with intensity 154A at the first time. The channels 139, 141 have the same intensities 151B, 153B at the second time as compared to the intensities 151A, 153A at the first time. The changed intensities 150B, 152B, 154B at the second time are associated with modified gain values 156 for the channels 138, 140, 142, respectively, and the unchanged intensities 151B, 153B at the second time are associated with unmodified gain values for the channels 139, 141, respectively.

In some implementations, the spatial audio data generator 114 can adjust the gain values 156 to emulate positioning of the audio headset 104 relative to the virtual speaker array 134 based on the location data 135. For example, in the exemplary virtual speaker array 134A at the first time, the audio headset 104 can be estimated to be at a location 158, which is depicted as the position of a user within the virtual speaker array 134A, while in the exemplary virtual speaker array 134B at the second time, the audio headset 104 can be estimated to be at a location 161. In some aspects, the locations 158, 161 of the audio headset 104 relative to the virtual speaker array 134 can be based at least on the location data 135.

In some aspects, the position of the audio headset 104 relative to the virtual speaker array 134 can be determined at a particular time. For example, the audio headset 104 can be determined to be at the center of the virtual speaker array 134 during an initialization process for spatial audio to be communicated to the audio headset 104. The signal analyzer 112 can be configured to obtain the location data 135 indicative of the location of the audio headset 104 relative to the device 102 during that initialization process. Subsequent positioning of the audio headset 104 can then be likewise determined by the signal analyzer 112, and the spatial audio data generator 114 can modify the gain values 156 if the position of the audio headset 104 changes.

In a particular aspect, the signal analyzer 112 can be configured to obtain the location data 135 of the audio headset 104 at a first time, as detailed above. The spatial audio data generator 114 can be configured to modify a reference point of a spatial audio field based on the audio headset 104 remaining at a particular location for a period of time following the first time, the period of time exceeding a threshold duration. For the purposes of the subject disclosure, a spatial audio field includes data representative of the virtual speaker array 134 arranged relative to a reference point. For example, the virtual speaker array 134 can be arranged relative to a center point such as the position of the audio headset 104 during the initialization process. This could place, for example, a user of the audio headset 104 at the location 158 at the center of the virtual speaker array 134 as illustrated at the virtual speaker array 134A.

As a user moves through physical space, the user's position will change. While some movement may be relatively temporary (e.g., as described above, a user can move closer to a particular channel of the virtual speaker array 134 as illustrated in the virtual speaker array 134B), for which it can be desirable to change intensity levels at particular channels of the virtual speaker array (e.g., as described above with reference to the virtual speaker array 134B). A user may, however, decide to stay at a certain location after moving there. For example, a user can move to another room of a building. In such a circumstance, it can be desirable to reset the reference point for the spatial audio field to be more closely aligned with the user's new location. The spatial audio data generator 114 can be configured to change the reference point of the spatial audio field to the user's new location, updating the arrangement of the virtual speaker array 134 based at least on the reference point of the spatial audio field. Data indicative of the updated arrangement can be stored at the virtual speaker array data 118. In a particular configuration, the spatial audio data generator 114 can be configured to modify the reference point only after the user has been at a new location for a period of time exceeding a threshold duration (e.g., two minutes).

In some implementations, the processor(s) 106 is configured to adjust spatial audio data for communication to the audio headset 104. The adjusted spatial audio data 160 can include, for example, an audio signal corresponding to each of the channels of the virtual speaker array 134. The adjusted spatial audio data 160 can include an audio signal corresponding to each of the channels of the virtual speaker array 134 where intensities associated with each of the channels may or may not have changed based on adjusted gain values 156 due to movement of the audio headset 104.

According to some aspects, the processor(s) 106 is configured to send audio data 122 corresponding to the adjusted spatial audio data 160 to the audio headset 104. In some implementations, the adjusted spatial audio data 160 can be communicated to the codec 116 for coding prior to communication to the modem 110, which can then transmit the audio data 122 to the audio headset 104 via the antenna 120. In a particular aspect, the processor(s) 106 are configured to generate a binauralized version of the adjusted spatial audio data 160, and the audio data 122 includes the binauralized version of the adjusted spatial audio data 160. In the same or alternative particular aspects, the audio data 122 includes the adjusted spatial audio data 160.

In operation, the device 102 can generate spatialized audio data for communication as part of the audio data 122 to the audio headset 104. The audio headset 104 can receive and decode the audio data 122 for playback at the speaker(s) 130. The playback at the audio headset 104 can include spatialized audio that can place the audio headset 104 amid the virtual speaker array 134 as part of a spatialized audio field, emulating the position of the user of the audio headset 104 amid the virtual speaker array 134.

As part of the communication between the device 102 and the audio headset 104, the audio headset 104 can communicate the wireless transmission 124 to the device 102. Using the wireless transmission 124, the processor(s) 106 of the device 102 can obtain the location data 135 indicative of the location of the audio headset 104 relative to the device 102. The processor(s) can use the location of the audio headset 104 relative to the device 102 to establish an initial position of the audio headset 104 within the spatialized audio field, to update the position of the audio headset 104 within the spatialized audio field, or some combination thereof.

If the position of the audio headset 104 within the spatialized audio field has changed, the processor(s) 106 can adjust one or more gain values 156 associated with one or more of the channels 138-142 of the virtual speaker array 134 to generate adjusted spatial audio data 160 that emulates the updated position of the audio headset 104 relative to the virtual speaker array 134. For example, the adjusted spatial audio data 160 can include data associated with the gain values 156 associated with the channels 138-142. The device 102 can then send audio data 122 data corresponding to the adjusted spatial audio data 160 to the audio headset 104.

Other aspects of the system 100 can be present without departing from the scope of the subject disclosure. For example, the system 100 can include a display device coupled to the processor(s) 106 and configured to output video corresponding to the audio data 122.

Figure 5:
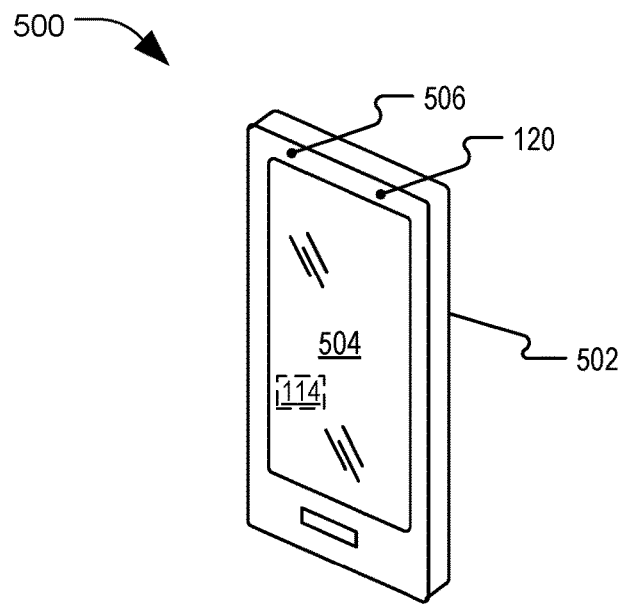
FIG. 5 depicts an example of a mobile device, such as a phone or tablet, as illustrative, non-limiting examples, that is configured to provide dynamic audio spatialization, in accordance with some examples of the present disclosure.

As an additional example, the device 102 can include a camera coupled to the processor(s) 106 and configured to identify an orientation of a user of the device 102, such as described further with reference to FIG. 5. In a particular implementation, the camera can be an "always on"-type camera that is receiving optical input substantially constantly. In such a configuration, the camera can be configured to leverage, for example, facial recognition instructions at the instructions 136 to identify when a user's face or head is within the field of vision of the camera and in what orientation the user is relative to the device 102 (e.g., facing the camera, looking away, looking back, etc.). By using the always on features of the camera, the processor(s) 106 can be configured to monitor the orientation of the user of the device 102.

The processor(s) 106 can be configured to generate orientation data indicative of an orientation of the audio headset 104 relative to the device 102, the orientation data based at least on the orientation of the user of the device 102. The processor(s) 106 can be configured to update the orientation of the user relative to the device 102 in addition to the location of the user (e.g., via the location of the audio headset 104) relative to the device 102. By tracking both the orientation and location of the user relative to the device 102, the processor(s) 106 can modify the spatial audio field to account for changes in the user's location, orientation, or any combination thereof. For example, if the user at the location 158 turns their head toward the channel 140 without moving their body in space, the processor(s) 106 can be configured to adjust the gain values 156 to increase the signal intensity 152 associated with the channel 140 (i.e., the user would expect a channel to grow louder as they turn toward it) while decreasing the signal intensity 151 associated with the channel 139 (and thus lower the associated gain value 156) that the user has turned away from and that may no longer be in the user's field of view, as illustrative, non-limiting examples.

Although the device 102 is described as a television, mobile phone, or a tablet computing device, in other implementations the device 102 includes or corresponds to one or more other types of electronic device, such as a wearable electronic device, a vehicle, a voice activated device, an audio device, a wireless speaker and voice activated device, a portable electronic device, a car, a vehicle, a computing device, a communication device, an internet-of-things (IoT) device, a virtual reality (VR) device, an augmented reality (AR) device, a mixed reality (MR) device, a smart speaker, a mobile computing device, a mobile communication device, a smart phone, a laptop computer, a computer, a personal digital assistant, a display device, a gaming console, an appliance, a music player, a radio, a digital video player, a digital video disc (DVD) player, a tuner, a camera, a navigation device, any other appropriate electronic device that can operate to provide spatial audio to the audio headset 104, or a combination thereof.

Thus, the system 100 can enable dynamic audio spatialization that accounts for a user's movement relative to a streaming audio source while maintaining an emulation of the acoustic interaction between a listener and a traditional surround sound audio configuration. For example, the system 100 can enable improve a user's experience that emulates the user's movement within a 22.2 (or other format) surround sound audio field for the user with the audio headset 104.

Figure 2:
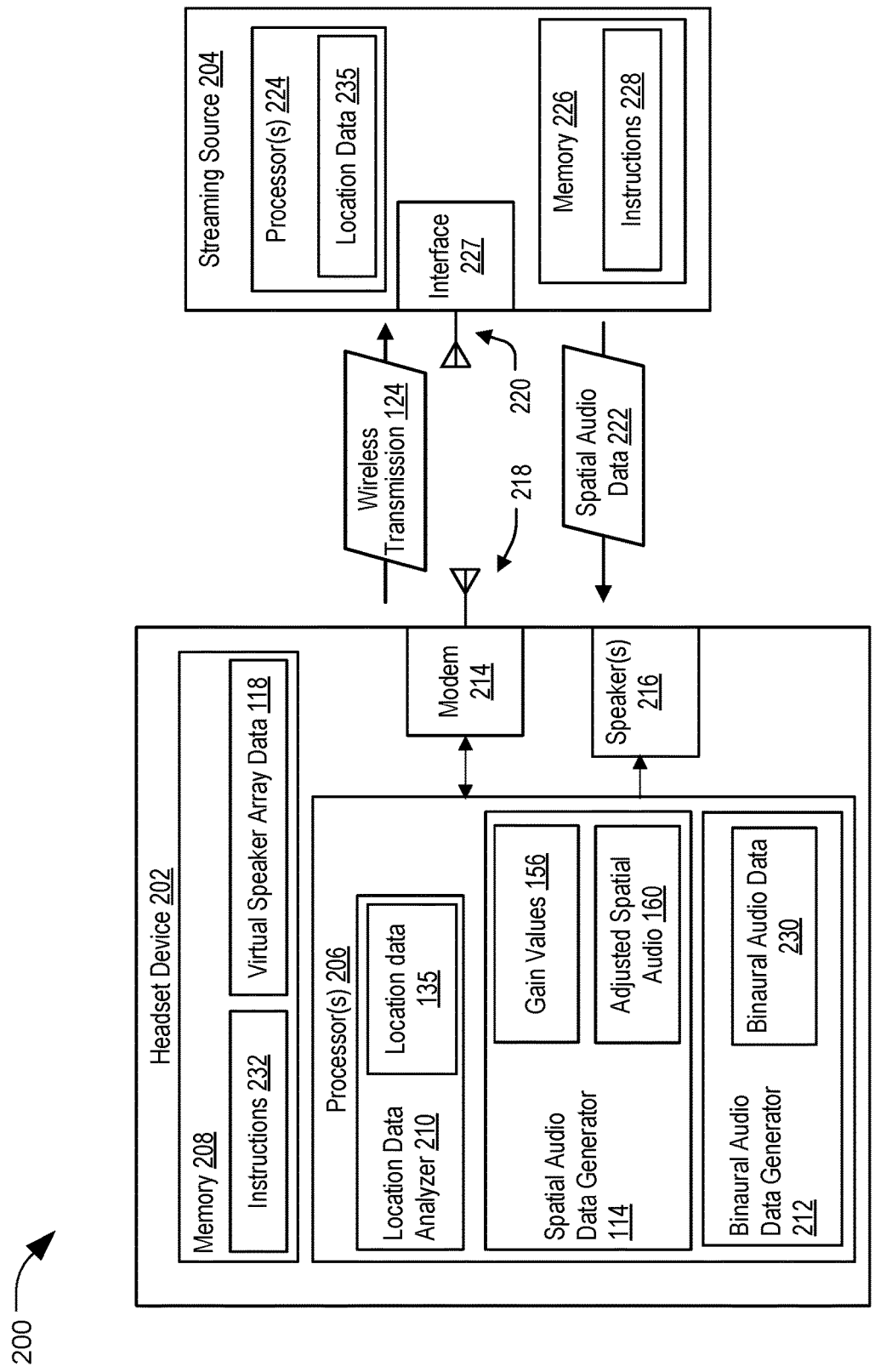
FIG. 2 is a block diagram of an example of a system that includes a headset device configured to provide dynamic audio spatialization, in accordance with some examples of the present disclosure.

FIG. 2 is a block diagram of an example of a system 200 that includes a headset device 202 configured to provide dynamic audio spatialization, in accordance with some examples of the present disclosure. In some implementations, the headset device 202 includes one or more processors 206 coupled to a memory 208 storing instructions 232 for execution by the processor(s) 206. The headset device 202 also includes an antenna 218 coupled to the processor(s) 206 via a modem 214 to enable communication with a steaming source 204.

As compared to FIG. 1 in which the device 102 performs the spatial audio adjustment based on location data received from the audio headset 104 and sends the adjusted audio data to the audio headset 104, in the system 200 the headset device 202 performs the spatial audio adjustment. To illustrate, the headset device 202 receives spatial audio data 222 from the streaming source 204, and the headset device 202 performs the spatial audio adjustment by updating the gain values 156 prior to binauralization and playout at speaker(s) 216. For example, the processor(s) 206 are configured to determine location data 135 indicative of a location of the headset device 202 relative to a streaming source 204. The processor(s) 206 are also configured to receive spatial audio data 222 from the streaming source 204. The processor(s) 206 are also configured to adjust one or more gain values 156 associated with one or more channels (e.g., the channels 138-142 of FIG. 1) of a virtual speaker array (e.g., the virtual speaker array 134 of FIG. 1) to generate adjusted spatial audio data 160 from the spatial audio data 222, the one or more gain values emulating a position of the headset device 202 relative to the virtual speaker array based on the location data 135. The processor(s) 206 are also configured to generate binaural audio data 230 corresponding to the adjusted spatial audio data 160 for playout at earphone speakers 216.

In some implementations, the streaming source 204 can include one or more processors 224 coupled to a memory 226 storing instructions 228 for execution by the processor(s) 224. The streaming source 204 also includes an antenna 220 coupled to the processor(s) 224 via an interface 227. The processor(s) 224 can be configured to generate data associated with audio data to be streamed to the headset device 202. The audio can include voice, music, other suitable audio, or some combination thereof. The processor(s) 224 can communicate the audio data to the interface 227, where the audio data can be prepared for transmission by the antenna 220. In some aspects, the antenna 220 can transmit data associated with the audio data for streaming as well as location data, as described in more detail below. In some aspects, the audio data and location data can be combined into a single communication stream as spatial audio data 222. In the same or alternative aspects, the audio data and location data can be transmitted separately and the spatial audio data 222 can include the audio data.

In some implementations, the headset device 202 includes or corresponds to an electronic device including the processor(s) 206 coupled to the memory 208. The headset device 202 can include, for example, headphones (wired, wireless, etc.), an electronic device, a portable speaker, an electronic device configured to output audio (e.g., an electronic device incorporated into another device such as a vehicle, virtual and/or extended reality device, smart speaker, camera, wearable electronic device, etc.), or some combination thereof.

In some implementations, the processor(s) 206 can be coupled to the antenna 218 via the modem 214 and is configured to generate a signal for transmission to the streaming source 204 via the antenna 218. The antenna 218 can be configured to transmit the wireless transmission 124 of FIG. 1 based at least on the signal received from the processor(s) 206 via the modem 214.

In some implementations, the headset device 202 includes one or more speakers 216 (e.g., earphone speakers) coupled to the processor(s) 206. The speaker(s) 216 can be configured to output an audio signal associated with spatial audio data 222 received at the headset device 202 via the antenna 218 from the streaming source 204. For example, the streaming source 204 can communicate spatial audio data 222 associated with streaming audio (e.g., voice, music, other audio content, or some combination thereof). The spatial audio data 222 can be received at the antenna 218 and communicated to the speaker(s) 216 and/or the processor(s) 206 via the modem 214. In a particular aspect, the headset device 202 can include a codec configured to decode the spatial audio data 222 for playback at the speaker(s) 216. The codec can be included at the processor(s) 206, part of another component of the headset device 202, a separate component of the headset device 202, or some combination thereof.

The wireless transmission 124 is received at the antenna 220 of the streaming source 204. According to an aspect, the antenna 220 includes one or more antenna elements. For example, the antenna 220 can correspond to an antenna array coupled to the processor(s) 224 and configured to receive the wireless transmission 124 from the headset device 202. Data associated with the wireless transmission 124 can be communicated to the processor(s) 224 via the interface 227.

The processor(s) 224 are configured to obtain, based on the wireless transmission 124, location data 235 indicative of the location of the headset device 202 relative to the streaming source 204. For example, in some aspects, the processor(s) 224 can analyze the wireless transmission 124 to obtain location data 235 from the data associated with the wireless transmission 124.

In some aspects, the location data 235 includes angle data indicative of an angle of the headset device 202 relative to the streaming source 204. In an example, the angle data includes an angle of arrival of the wireless transmission 124 from the headset device 202 to the streaming source 204. In the same or alternative aspects, the location data 135 includes distance data indicative of a linear distance between the headset device 202 and the streaming source 204. In a particular implementation, the distance data is based at least on a signal strength measurement of the wireless transmission 124 from the headset device 202 to the streaming source 204.

For example, in an implementation in which the wireless transmission 124 includes a BLUETOOTH® Low Energy signal, the processor(s) 224 is configured to determine angle data indicative of an angle of the headset device 202 relative to the streaming source 204, the angle data including an angle of arrival of the wireless transmission 124 from the headset device 202 to the streaming source 204. As an additional example, the processor(s) 224 can be configured to determine distance data based at least on a signal strength measurement of the wireless transmission 124 from the headset device 202 to the streaming source 204.

In a particular aspect, the antenna 120 can enable determination, by the processor(s) 224, the angle of arrival of the wireless transmission 124. As described in more detail below with reference to FIG. 3, for example, the streaming source 204 can use a plurality of antennas 220 to determine an angle of arrival of the wireless transmission 124 and also to generate an approximation of the distance between the headset device 202 and the streaming source 204 using a received signal strength indicator measurement of the wireless transmission 124. According to some aspects, the device 102 includes a BLUETOOTH® Low Energy-type receiver, and the location data 235 is based on at least one of the angle of arrival or the received signal strength indicator that corresponds to the wireless transmission 124 and that is obtained from the BLUETOOTH® Low Energy-type receiver.

According to an aspect, the streaming source 204 communicates the location data 235 to the headset device 202. For example, the location data 235 can be included as part of the spatial audio data 222, as a separate communication, or some combination thereof. A location data analyzer 210 of the processor(s) 206 can be configured to analyze the location data 235 to determine the location data 135 o FIG. 1. The location data 135 can include, for example, data associated with an emulated positioning of the headset device 202 relative to a virtual speaker array (e.g., the virtual speaker array 134 of FIG. 1) based on the location data 235.

In some implementations, the spatial audio data generator 114, present at the processor(s) 206 of the headset device 202, is configured to adjust one or more gain values 156 associated with one or more channels of a virtual speaker array to generate adjusted spatial audio that emulates positioning of the headset device 202 relative to the virtual speaker array based on the location data 135, as described in more detail above with reference to FIG. 1.

In some aspects, each channel of the virtual speaker array can have an associated gain value (e.g., the gain values 156). A gain value associated with a particular channel can modify an intensity of an audio signal associated with the particular channel. By modifying the gain values 156, the spatial audio data generator 114 can modify the intensities associated with each channel of the virtual speaker array. In some implementations, the spatial audio data generator 114 can adjust the gain values 156 to emulate positioning of the headset device 202 relative to the virtual speaker array based on the location data 135, as described in more detail above with reference to FIG. 1.

In some aspects, the position of the headset device 202 relative to the virtual speaker array can be determined at a particular time. For example, the headset device 202 can be determined to be at the center of the virtual speaker array during an initialization process for spatial audio. The location data analyzer 210 can be configured to obtain the location data 135 indicative of the location of the headset device 202 relative to the streaming source 204 during that initialization process. Subsequent positioning of the headset device 202 can then be likewise determined by the location data analyzer 210, and the spatial audio data generator 114 can modify the gain values 156 if the position of the headset device 202 changes, as described in more detail above with reference to FIG. 1.

In a particular aspect, the location data analyzer 210 can be configured to obtain the location data 135 of the headset device 202 at a first time, as detailed above. For example, the virtual speaker array (e.g., the virtual speaker array 134 of FIG. 1) can be arranged relative to a center point such as the position of the headset device 202 during the initialization process. This could place, for example, a user of the headset device 202 at the center of the virtual speaker array. The location data analyzer 210 can be configured to modify a reference point of a spatial audio field based on the headset device 202 remaining at a particular location for a period of time following the first time, the period of time exceeding a threshold duration.

As a user moves through physical space, the user's position changes. Some movement may be relatively temporary (e.g., as described above with reference to FIG. 1, a user can move closer to a particular channel of the virtual speaker array), for which it can be desirable to change intensity levels at particular channels of the virtual speaker array. A user may, however, decide to stay at a certain location after moving there. For example, a user can move to another room of a building. In such a circumstance, it can be desirable to reset the reference point for the spatial audio field to be more closely aligned with the user's new location. The spatial audio data generator 114 can be configured to change the reference point of the spatial audio field to the user's new location, updating the arrangement of the virtual speaker array based at least on the reference point of the spatial audio field. Data indicative of the updated arrangement can be stored at the virtual speaker array data 118. In a particular configuration, the spatial audio data generator 114 can be configured to modify the reference point only after the user has been at a new location for a period of time exceeding a threshold duration (e.g., two minutes).

In some implementations, the processor(s) 206 is also configured to adjust spatial audio data for playback at the speaker(s) 216. The adjusted spatial audio data 160 can include, for example, an audio signal corresponding to each of the channels of the virtual speaker array. The adjusted spatial audio data 160 can include an audio signal corresponding to each of the channels of the virtual speaker array where intensities associated with each of the channels may or may not have changed based on adjusted gain values 156 due to movement of the headset device 202.

In some implementations, the headset device 202 also includes a binaural audio data generator 212 configured to generate binaural audio data 230 based on the spatial audio data 222, the adjusted spatial audio data 160, or some combination thereof. The binaural audio data 230 can be communicated to the speaker(s) 216 for playback. In a particular aspect, the speaker(s) 216 are earphone speakers.

In operation, the streaming source 204 can generate spatial audio data 222 for communication as to the headset device 202. The headset device 202 can receive and decode the spatial audio data 222 for playback at the speaker(s) 216. The playback at the headset device 202 can include spatialized audio that can place the headset device 202 amid a virtual speaker array as part of a spatialized audio field, emulating the position of the user of the headset device 202 amid the virtual speaker array.

As part of the communication between the streaming source 204 and the headset device 202, the headset device 202 can communicate the wireless transmission 124 to the streaming source 204. Using the wireless transmission 124, the processor(s) 224 of the streaming source 204 can obtain certain location data 235. The streaming source 204 can be configured to communicate the location data 235 back to the headset device 202.

The processor(s) 206 of the headset device 202 can be configured to determine the location data 135 indicative of the location of the headset device 202 relative to the streaming source 204 based at least on the location data 235. The processor(s) 206 can use the location of the headset device 202 relative to the streaming source 204 to establish an initial position of the headset device 202 within a spatialized audio field, to update the position of the headset device 202 within the spatialized audio field, or some combination thereof.

If the position of the headset device 202 within the spatialized audio field has changed, the processor(s) 206 can adjust one or more gain values 156 associated with one or more channels of the virtual speaker array to generate adjusted spatial audio data 160 that emulates the updated position of the headset device 202 relative to the virtual speaker array. The headset device 202 can then generate the adjusted spatial audio data 160 based at least on the updated position.

Other aspects of the system 200 can be present without departing from the scope of the subject disclosure. For example, the system 200 can include a display device coupled to the processor(s) 206 and configured to output video corresponding to the audio data.

The system 200 can thus enable dynamic audio spatialization in a manner that allows the processing associated with determining the dynamic audio spatialization to be location at the headset device 202 rather than at the streaming source 204. This can enable, for example, a user using an extended reality headset (e.g., as described in more detail below with reference to FIG. 11) to experience dynamic audio spatialization associated with streaming audio from an external source outside of the extended reality environment. By including the spatial audio data generator 114 at the headset device 202, the system 200 enables generation of the adjusted spatial audio data 160 responsive to movement of the headset device 202 in implementations in which the streaming source 204 provides the spatial audio data 222 but is not configured to support generation of the adjusted spatial audio data 160.

Figure 3:
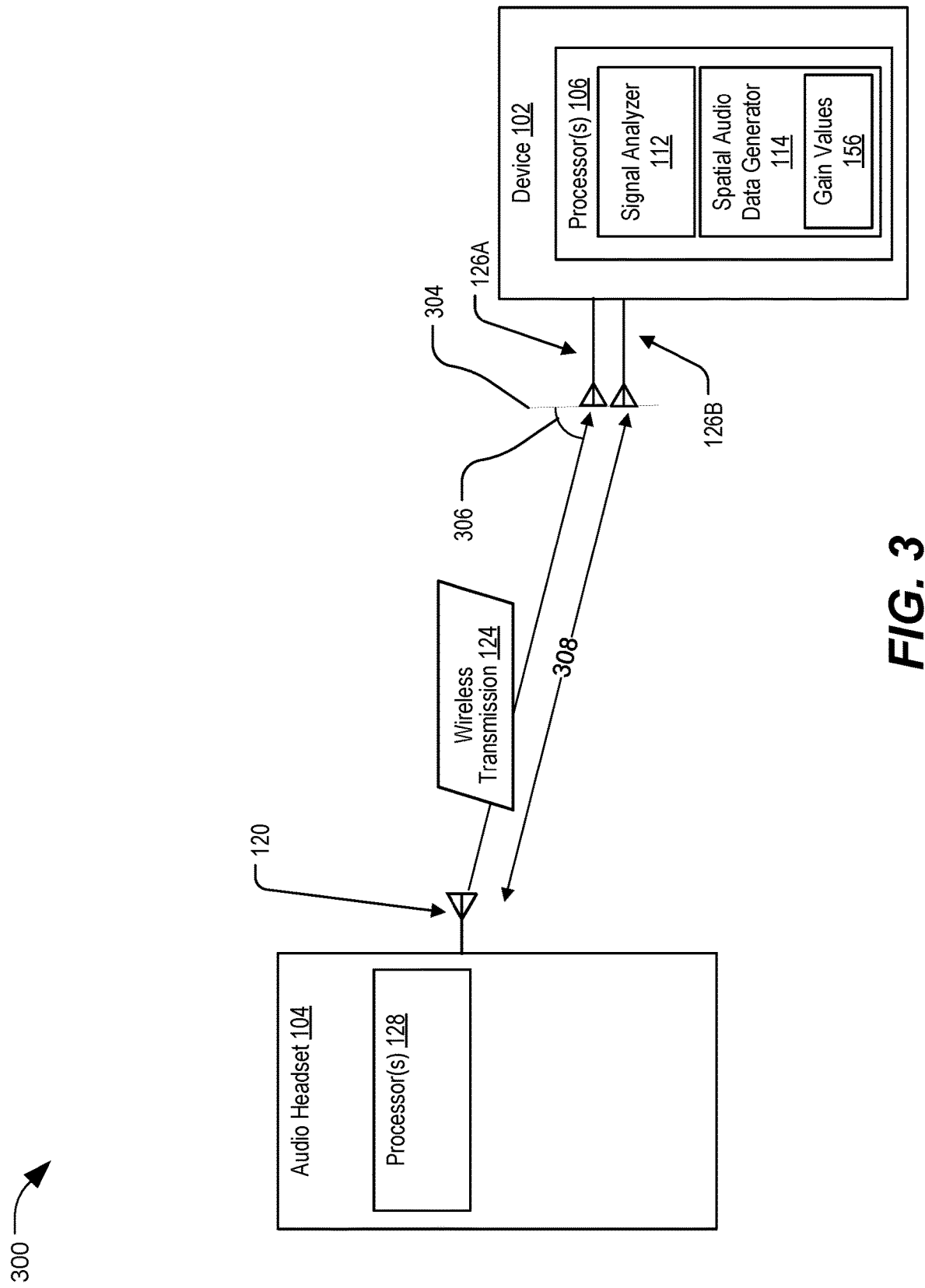
FIG. 3 illustrates an example system for measuring angle data and distance data, in accordance with some examples of the present disclosure.

FIG. 3 illustrates an example system 300 for measuring angle data and distance data, in accordance with some examples of the present disclosure. In some implementations, the system 300 includes the device 102 configured to communicate audio data corresponding to the adjusted spatial audio data to the audio headset 104, as described in more detail above with reference to FIG. 1. In the illustrative example of FIG. 3, the audio headset 104 is communicating the wireless transmission 124 of FIG. 1 via the antenna 120.

In some implementations, the wireless transmission 124 can include a plurality of components. For example, if the audio headset 104 is configured to transmit a BLUETOOTH® Low Energy signal, such a signal is generally omnidirectional. Thus, the wireless transmission 124 can be incident at a first antenna 126A at a first time and at a second antenna 126B at a second time. The signal analyzer 112 of FIG. 1 can be configured to analyze aspects of the wireless transmission 124 received at each of the plurality of antennas to determine information associated with the wireless transmission 124. For example, the signal analyzer 112 can analyze a phase difference between the signal associated with the arrival of the wireless transmission 124 at the first antenna 126A and the signal associated with the arrival of the wireless transmission 124 at the second antenna 126B to estimate an angle of arrival 306 (i.e., an angle between the direction of propagation of the wireless transmission 124 and a line 304 representing a reception surface of the plurality of antennas 126). Based on the angle of arrival 306, the processor(s) 106 can estimate an angle of a transmission propagation path between the audio headset 104 and the device 102. Along with distance data, described below, the processor(s) 106 can be configured to obtain location data (e.g., the location data 135 of FIG. 1) indicative of a location of the audio headset 104 relative to the device 102 based on the wireless transmission 124 from the audio headset 104.

In a particular aspect, the signal analyzer 112 can be configured to analyze the angle data associated with the angle of arrival 306 for changes over time rather than generating an estimate of the angle of arrival 306 at each measurement time. The signal analyzer 112 can be configured to use measurements of the change in angle of arrival 306 to obtain location data (e.g., the location data 135 of FIG. 1) of the audio headset 104 relative to the device 102.

In some aspects, the signal analyzer 112 of FIG. 1 can also be configured to determine location information. For example, the signal analyzer 112 can be configured to determine a received signal strength indicator associated with the wireless transmission 124 or another wireless signal between the device 102 and the audio headset 104. The signal analyzer 112 can estimate a linear distance 308 between the antenna 120 of the audio headset 104 and the antenna(s) 126 of the device 102 based at least on the received signal strength indicator. In a particular aspect, the signal analyzer 112 can be configured to analyze changes in the received signal strength indicator over time. The signal analyzer 112 can be configured to use changes in the received signal strength indicator to estimate the linear distance between the audio headset 104 and the device 102. The signal analyzer 112 can be further configured to use the distance data to obtain location data (e.g., the location data 135 of FIG. 1) of the audio headset 104 relative to the device 102.

Although illustrated using the device 102 and the audio headset 104 of FIG. 1, it should be understood that the described techniques to obtain the angle of arrival 306, the linear distance 308, or both, can be implemented in the steaming source 204 in conjunction with determining the location data 235 to determine the angle of arrival 306, the linear distance 308, or both, corresponding to the wireless transmission 124 from the headset device 202 of FIG. 2.

Figure 4:
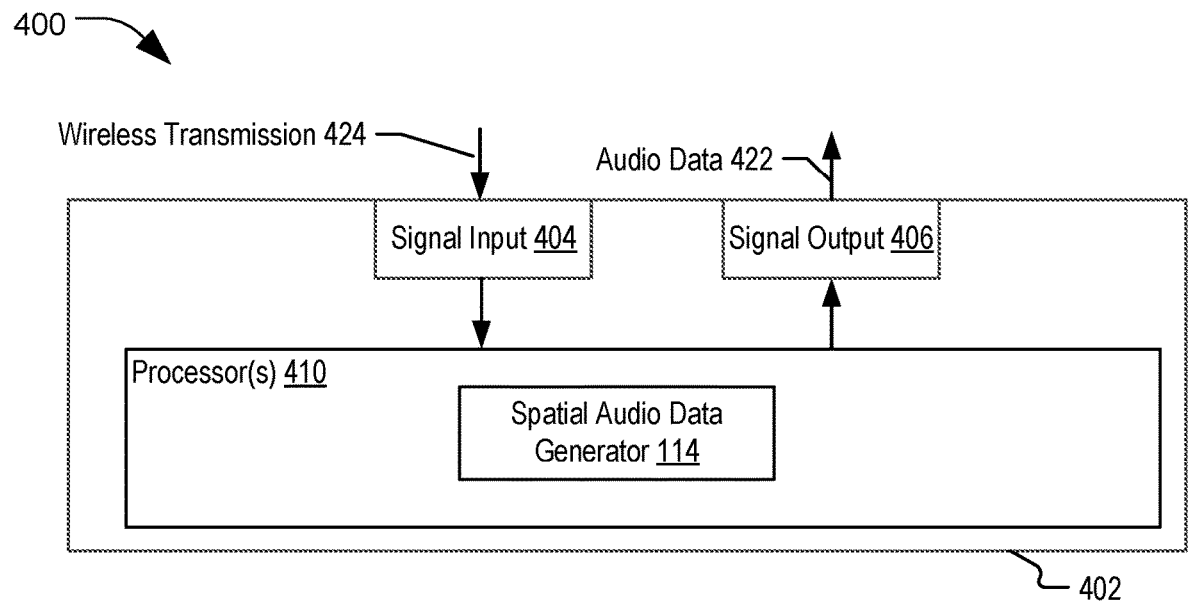
FIG. 4 illustrates an example of an integrated circuit operable to enable dynamic audio spatialization, in accordance with some examples of the present disclosure.

FIG. 4 depicts an implementation 400 of the device 102 as an integrated circuit 402 that includes one or more processors 410, such as the processor(s) 106 or the processors(s) 206, that include the spatial audio data generator 114. The integrated circuit 402 also includes a signal input 404, such as one or more bus interfaces, to enable a wireless transmission 424 to be received for processing. The integrated circuit 402 also includes a signal output 406, such as a bus interface, to enable sending of an output signal, such as audio data 422. For example, in some implementations, the wireless transmission 424 corresponds to the wireless transmission 124 received by the antenna 120 of FIG. 1, and the audio data 422 corresponds to the audio data 122 of FIG. 1. In another implementation, the wireless transmission 424 can include the spatial audio data 222 and the location data 235 of FIG. 2, and the audio data 422 corresponds to the adjusted spatial audio data 160, the binaural audio data 230, or both, of FIG. 2.

Figure 6:
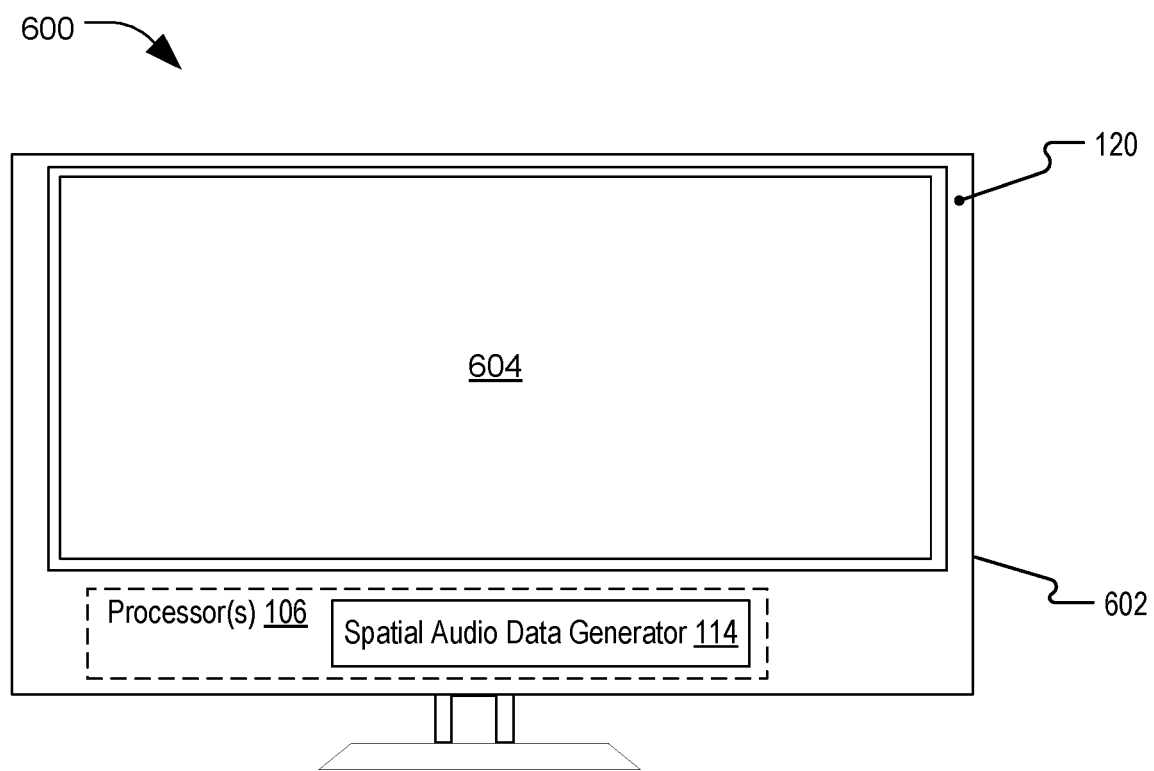
FIG. 6 depicts an example of a television that is configured to provide dynamic audio spatialization, in accordance with some examples of the present disclosure.
Figure 7:
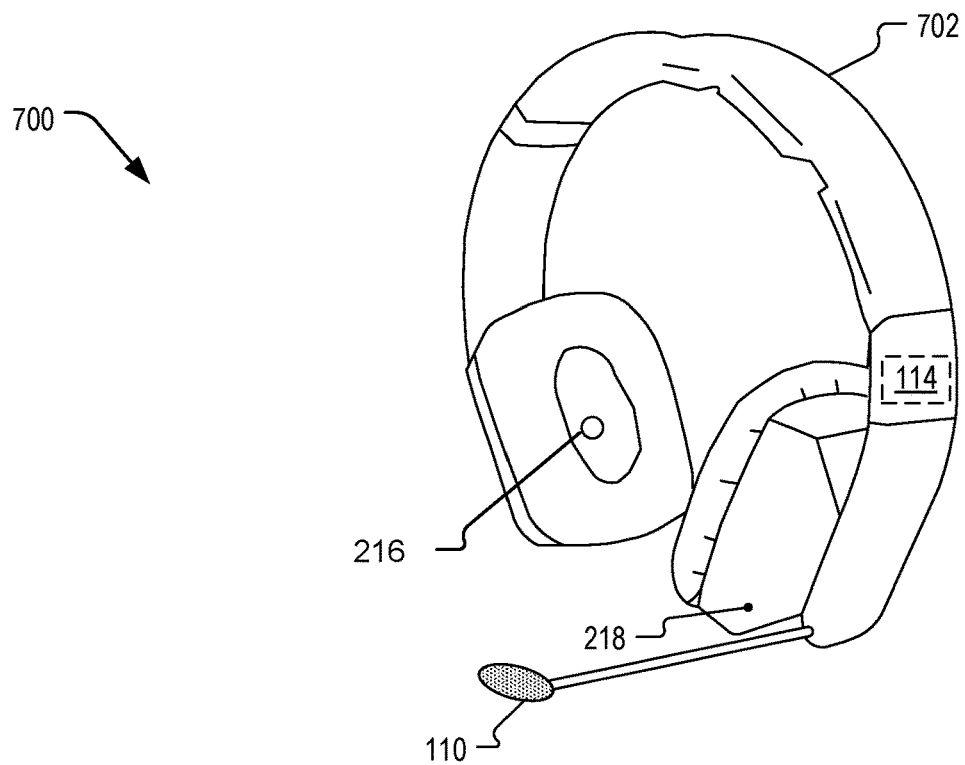
FIG. 7 depicts an example of a headset device that is configured to provide dynamic audio spatialization, in accordance with some examples of the present disclosure.
Figure 8:
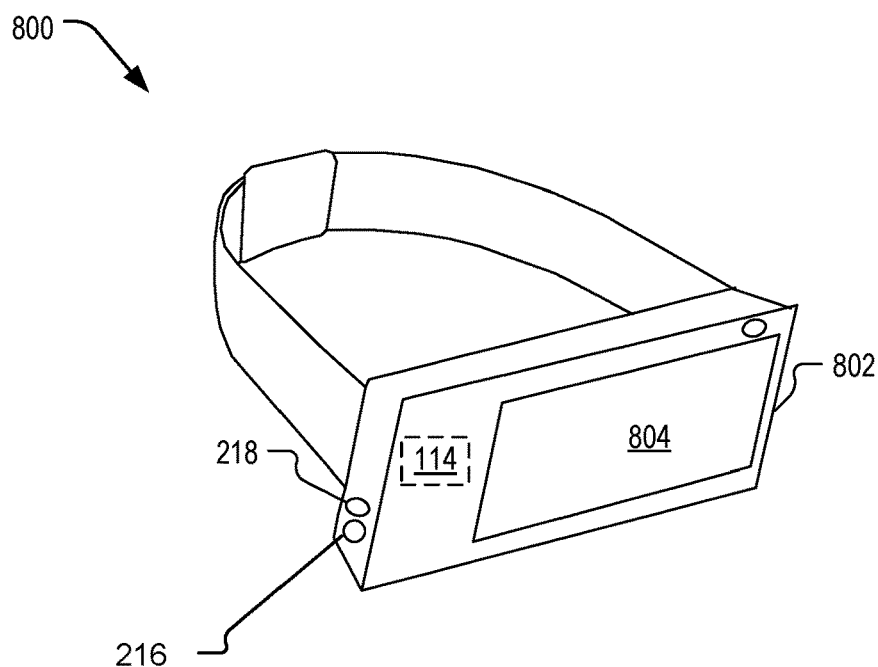
FIG. 8 depicts an example of a wearable electronic device, illustrated as a "smart watch," that is configured to provide dynamic audio spatialization, in accordance with some examples of the present disclosure.
Figure 9:
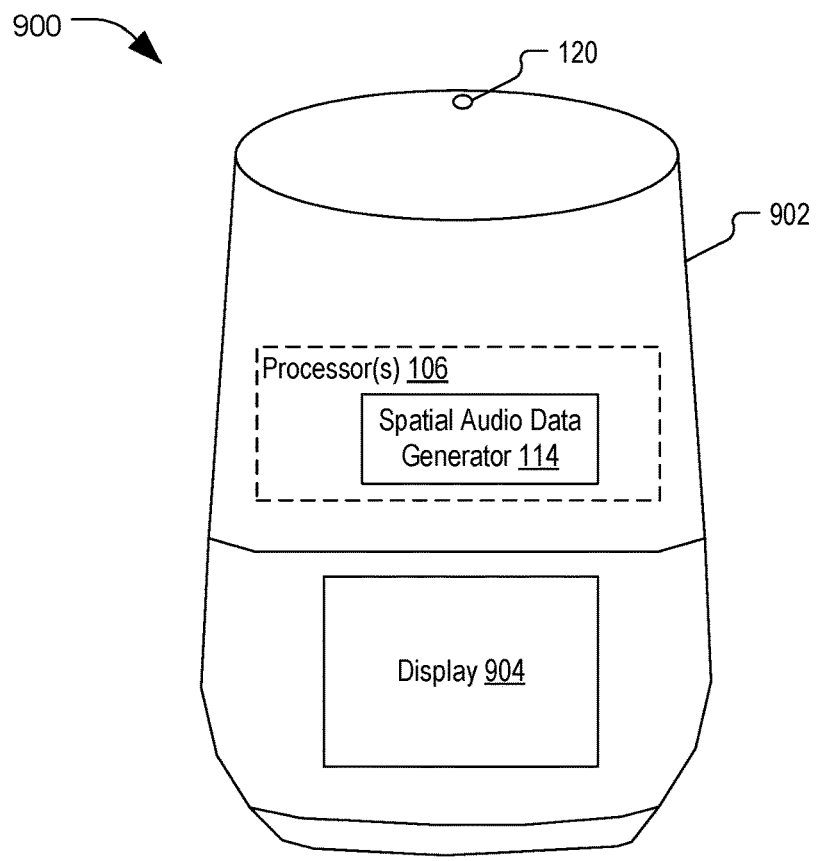
FIG. 9 depicts an example of a wireless speaker and voice activated device that is configured to provide dynamic audio spatialization, in accordance with some examples of the present disclosure.
Figure 10:
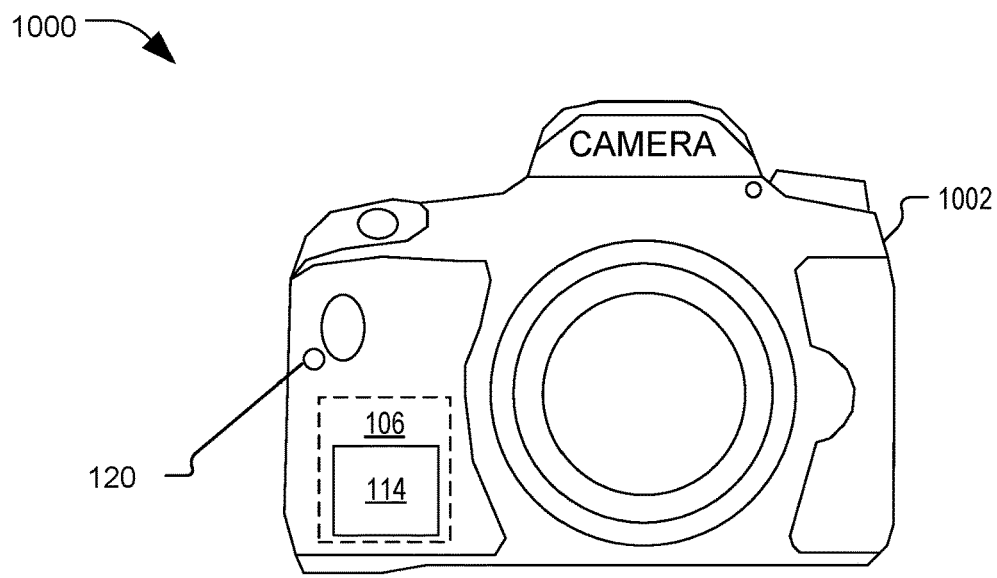
FIG. 10 depicts an example of a portable electronic device that corresponds to a camera that is configured to provide dynamic audio spatialization, in accordance with some examples of the present disclosure.
Figure 11:
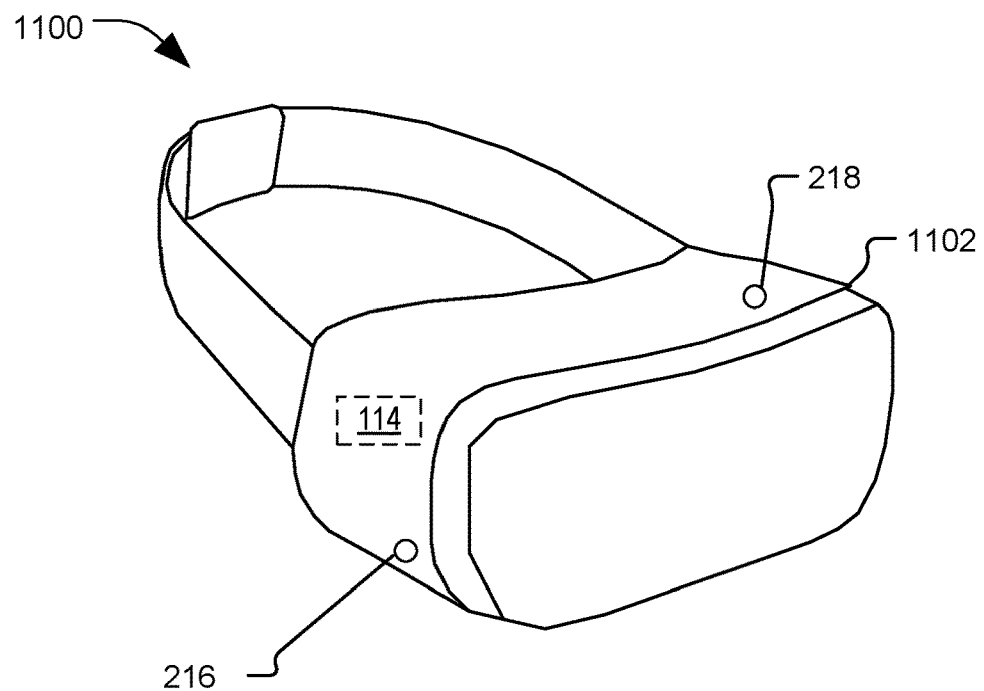
FIG. 11 depicts an example of a portable electronic device that corresponds to an extended reality headset (e.g., a virtual reality headset, a mixed reality headset, an augmented reality headset, or a combination thereof) that is configured to provide dynamic audio spatialization, in accordance with some examples of the present disclosure.
Figure 12:
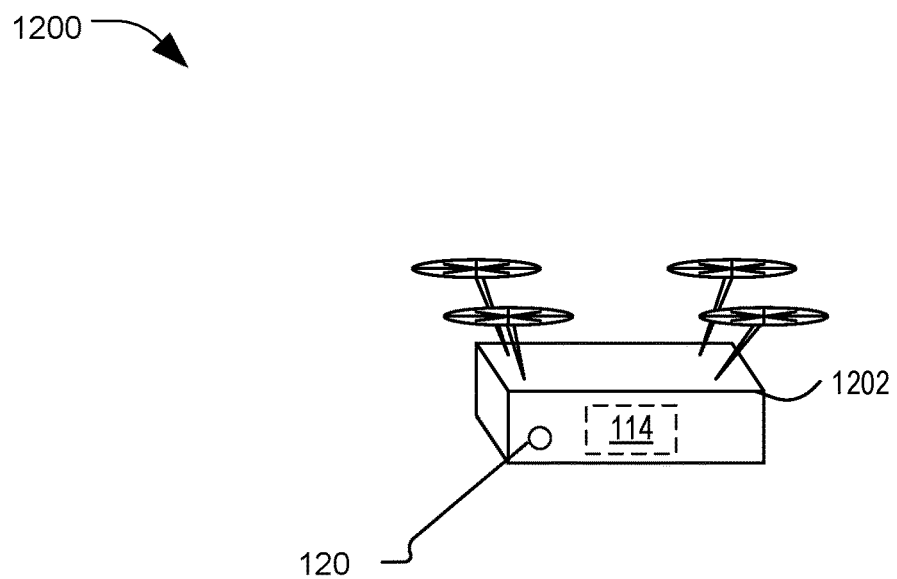
FIG. 12 depicts an example of a vehicle, illustrated as a manned or unmanned aerial device (e.g., a package delivery drone), that is configured to provide dynamic audio spatialization, in accordance with some examples of the present disclosure.
Figure 13:
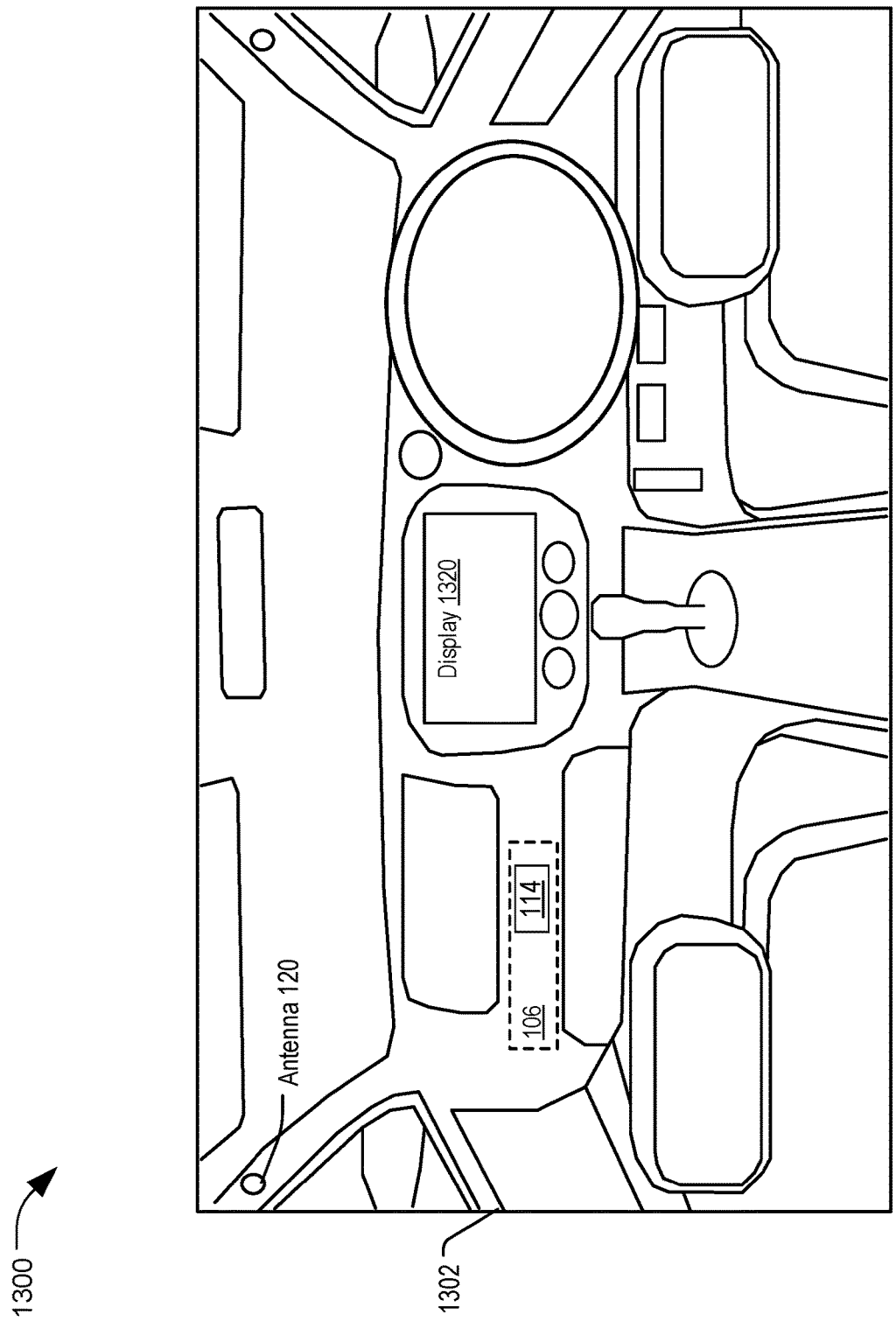
FIG. 13 depicts an example of a vehicle, illustrated as a car, that is configured to provide dynamic audio spatialization, in accordance with some examples of the present disclosure.

The integrated circuit 402 enables implementation of improved dynamic audio spatialization as a component in a system in which audio data is adjusted based on a location of a headset relative to a streaming device, such as in a mobile phone or tablet as depicted in FIG. 5, a television as depicted in FIG. 6, a headset as depicted in FIG. 7, a wearable electronic device as depicted in FIG. 8, a voice-controlled speaker system as depicted in FIG. 9, a camera as depicted in FIG. 10, a virtual reality, mixed reality, or augmented reality headset as depicted in FIG. 11, or a vehicle as depicted in FIG. 12 or FIG. 13.

FIG. 5 depicts an implementation 500 in which the device 102 includes a mobile device 502, such as a phone or tablet, as illustrative, non-limiting examples. The mobile device 502 includes the antenna(s) 120 and a display screen 504. Components of the processor(s) 106 of FIG. 1, including the spatial audio data generator 114, are integrated in the mobile device 502. In a particular example, the antenna(s) 120 may receive a wireless transmission (e.g., the wireless transmission 124 of FIG. 1) from an audio headset (not shown) and obtain location data based on the wireless transmission, the location data indicative of a location of the audio headset relative to the mobile device 502. The spatial audio data generator 114 can operate to adjust one or more gain values associated with one or more channels of a virtual speaker array to generate adjusted spatial audio data that emulates positioning of an audio headset relative to the virtual speaker array based on location data, as described in more detail above with reference to FIGS. 1-3.

In some implementations, the mobile device 502 can also include a camera 506 coupled to the processor(s) 106 of FIG. 1. The camera 506 can be configured to identify an orientation of a user of the mobile device 502. For example, the camera 506 can be configured to determine if the user is facing the mobile device 502, looking away from the mobile device 502, not present within an optical range of the camera 506, etc. The processor(s) 106 can be configured to generate orientation data indicative of the orientation of the user and the associated audio headset relative to the mobile device 502. In such configurations, the mobile device 502 can generate dynamic spatialized audio for the user that emulates the user turning toward (or away) from a particular channel of the virtual speaker array.

FIG. 6 depicts an implementation 600 in which the device 102 corresponds to, or is integrated within, a television 602. The television 602 includes the antenna(s) 120 and a display screen 604. Components of the processor(s) 106 of FIG. 1, including the spatial audio data generator 114, are integrated in the television 602. In a particular example, the antenna(s) 120 may receive a wireless transmission (e.g., the wireless transmission 124 of FIG. 1) and obtain location data based on the wireless transmission, the location data indicative of a location of an audio headset relative to the television 602. The spatial audio data generator 114 can operate to adjust one or more gain values associated with one or more channels of a virtual speaker array to generate adjusted spatial audio data that emulates positioning of the audio headset relative to the virtual speaker array based on location data, as described in more detail above with reference to FIGS. 1-3.

FIG. 7 depicts an implementation 700 in which the headset device 202 of FIG. 2 includes a headset device 702. The headset device 702 includes the antenna(s) 218 and the speaker(s) 216 of FIG. 2. Components of the processor(s) 206 of FIG. 2, including the spatial audio data generator 114, are integrated in the headset device 702. In a particular example, the antenna 218 receives angle data and distance data from a streaming source. The location data analyzer 210 of FIG. 2 operates to determine location data indicative of a location of the headset device 702 relative to the streaming source. The spatial audio data generator 114 adjusts one or more gain values associated with one or more channels of a virtual speaker array to generate adjusted spatial audio data that emulates positioning of the headset device 702 relative to the virtual speaker array based on the location data, as described in more detail above with reference to FIGS. 1-3.

FIG. 8 depicts an implementation 800 in which the device 102 includes a wearable electronic device 802, illustrated as a "smart watch." The wearable electronic device 802 includes the antenna(s) 218 and the speaker(s) 216 of FIG. 2. The wearable electronic device 802 also includes a display screen 804. Components of the processor(s) 206 of FIG. 2, including the spatial audio data generator 114, are integrated in the wearable electronic device 802. In a particular example, the antenna 218 receives angle data and distance data from a streaming source. The location data analyzer 210 of FIG. 2 operates to determine location data indicative of a location of the wearable electronic device 802 relative to the streaming source. The spatial audio data generator 114 can operate to adjust one or more gain values associated with one or more channels of a virtual speaker array to generate adjusted spatial audio data that emulates positioning of wearable electronic device 802 relative to the virtual speaker array based on location data, as described in more detail above with reference to FIGS. 1-3.

FIG. 9 depicts an implementation 900 in which the device 102 includes a wireless speaker and voice activated device 902. The wireless speaker and voice activated device 902 can have wireless network connectivity and is configured to execute an assistant operation. The wireless speaker and voice activated device 902 includes the antenna(s) 120 of FIG. 1. The wireless speaker and voice activated device 902 can also include a display screen 904. Components of the processor(s) 106 of FIG. 1, including the spatial audio data generator 114, are integrated in the wireless speaker and voice activated device 902. In a particular example, the antenna 120 receives angle data and distance data from an audio headset 104. The signal analyzer 112 of FIG. 1 operates to determine location data 135 indicative of a location of the audio headset 104 relative to the voice activated device 902. The spatial audio data generator 114 can operate to adjust one or more gain values associated with one or more channels of a virtual speaker array to generate adjusted spatial audio data that emulates positioning of the audio headset 104 relative to the virtual speaker array based on the location data 135, as described in more detail above with reference to FIGS. 1-3.

FIG. 10 depicts an implementation 1000 in which the device 102 is integrated into or includes a portable electronic device that corresponds to a camera 1002. The camera 1002 includes the antenna(s) 120 of FIG. 1. Components of the processor(s) 106 of FIG. 1, including the spatial audio data generator 114, are integrated in the camera 1002. In a particular example, the antenna 120 receives angle data and distance data from an audio headset 104. The signal analyzer 112 of FIG. 1 operates to determine location data 135 indicative of a location of the audio headset 104 relative to the camera 1002. The spatial audio data generator 114 can operate to adjust one or more gain values associated with one or more channels of a virtual speaker array to generate adjusted spatial audio data that emulates positioning of the audio headset 104 relative to the virtual speaker array based on the location data 135, as described in more detail above with reference to FIGS. 1-3.

FIG. 11 depicts an implementation 1100 in which the headset device 202 is a portable electronic device that corresponds to an extended reality headset 1102 (e.g., a virtual reality headset, a mixed reality headset, an augmented reality headset, or a combination thereof). The extended reality headset 1102 includes the antenna(s) 218 and the speaker(s) 216 of FIG. 2. Components of the processor(s) 206 of FIG. 2, including the spatial audio data generator 114, are integrated in the extended reality headset 1102. In a particular example, the antenna 218 receives angle data and distance data from a streaming source. The location data analyzer 210 of FIG. 2 operates to determine location data indicative of a location of the extended reality headset 1102 relative to the streaming source. The spatial audio data generator 114 can operate to adjust one or more gain values associated with one or more channels of a virtual speaker array to generate adjusted spatial audio data that emulates positioning of the extended reality headset 1102 relative to the virtual speaker array based on location data, as described in more detail above with reference to FIGS. 1-3.

FIG. 12 depicts an implementation 1200 in which the device 102 corresponds to, or is integrated within, a vehicle 1202, illustrated as a manned or unmanned aerial device (e.g., a package delivery drone). The vehicle 1202 includes the antenna(s) 120 of FIG. 1. Components of the processor(s) 106 of FIG. 1, including the spatial audio data generator 114, are integrated in the vehicle 1202. In a particular example, the antenna 120 receives angle data and distance data from an audio headset 104. The signal analyzer 112 of FIG. 1 operates to determine location data 135 indicative of a location of the audio headset 104 relative to the vehicle 1202. The spatial audio data generator 114 can operate to adjust one or more gain values associated with one or more channels of a virtual speaker array to generate adjusted spatial audio data that emulates positioning of the audio headset 104 relative to the virtual speaker array based on the location data 135, as described in more detail above with reference to FIGS. 1-3. In such a manner, the vehicle 1202 can be used as, for example, a personal entertainment device that can be used to provide dynamic audio spatialization to different users over a variety of terrain.

FIG. 13 depicts an implementation 1300 in which the device 102 corresponds to, or is integrated within, a vehicle 1302, illustrated as a car. The vehicle 1302 includes the antenna(s) 120 of FIG. 1. The vehicle 1302 can also include a display screen 1320.

Components of the processor(s) 106 of FIG. 1, including the spatial audio data generator 114, are integrated in the vehicle 1302. In a particular example, the antenna 120 receives angle data and distance data from an audio headset 104. The signal analyzer 112 of FIG. 1 operates to determine location data 135 indicative of a location of the audio headset 104 relative to the vehicle 1302. The spatial audio data generator 114 can operate to adjust one or more gain values associated with one or more channels of a virtual speaker array to generate adjusted spatial audio data that emulates positioning of the audio headset 104 relative to the virtual speaker array based on the location data 135, as described in more detail above with reference to FIGS. 1-3. In such a manner the vehicle 1302 can be used to, for example, provide dynamic audio spatialization to a plurality of users within the vehicle 1302, where the vehicle 1302 can track each user's movement and each individual user experiences a personalized audio environment emulation.

Devices (e.g., those previously mentioned in FIGS. 1-13) may have both BLUETOOTH and WI-FI® capabilities (WI-FI is a registered trademark of the Wi-Fi Alliance Corp., a California corporation), or other wireless means to communicate with each other. Inter-networked devices may have wireless means to communicate with each other and may also be connected based on different cellular communication systems, such as, a Long Term Evolution (LTE) system, a Code Division Multiple Access (CDMA) system, a Global System for Mobile Communications (GSM) system, a wireless local area network (WLAN) system, or some other wireless system. A CDMA system may implement Wideband CDMA (WCDMA), CDMA 1x, Evolution-Data Optimized (EVDO), Time Division Synchronous CDMA (TD-SCDMA), or some other version of CDMA. As used herein, "wireless" refers to one or more of the above-listed technologies, one or more other technologies that enable transfer of information other than via wires, or a combination thereof.

Wireless technologies, such as BLUETOOTH and Wireless Fidelity "WI-FI" or variants of WI-FI (e.g. Wi-Fi Direct), enable high speed communications between mobile electronic devices (e.g., cellular phones, watches, headphones, remote controls, etc.) that are within relatively short distances of one another (e.g., 100 to 200 meters or less depending on the specific wireless technology). WI-FI is often used to connect and exchange information between a device with an access point, (e.g. a router) and devices that are WI-FI enabled. Examples of such devices are smart televisions, laptops, thermostats, personal assistant devices, home automation devices, wireless speakers, and other similar devices. Similarly, BLUETOOTH is also used to couple devices together. Examples of such are mobile phones, computers, digital cameras, wireless headsets, keyboards, mice or other input peripherals, and similar devices.

In conjunction with the described implementations, an apparatus includes means for obtaining, at one or more processors and based on a wireless transmission from an audio headset, location data indicative of a location of the audio headset relative to a computing device. For example, the means for obtaining the location data 135 of FIG. 1 include the device 102, the processor(s) 106, the signal analyzer 112, the headset device 202, the processor(s) 206, the location data analyzer 210, one or more other circuits or components configured to obtain, at one or more processors and based on a wireless transmission from an audio headset, location data indicative of a location of the audio headset relative to a computing device, or any combination thereof.

The device also includes means for adjusting, at the one or more processors, one or more gain values associated with one or more channels of a virtual speaker array to generate adjusted spatial audio data that emulates positioning of the audio headset relative to the virtual speaker array based on the location data. For example, the means for adjusting the gain values 156 of FIG. 1 include the device 102, the processor(s) 106, the spatial audio data generator 114, the headset device 202, the processor(s) 206, one or more other circuits or components configured to, at the one or more processors, one or more gain values associated with one or more channels of a virtual speaker array to generate adjusted spatial audio data that emulates positioning of the audio headset relative to the virtual speaker array based on the location data, or any combination thereof.

The device also includes means for sending audio data corresponding to the adjusted spatial audio data to the audio headset. For example, the means for sending audio data can include the device 102, the processor(s) 106, the modem 110, the antenna 120, the streaming source 204, the processor(s) 224, the interface 227, the antenna 220, one or more other circuits or components configured to send audio data corresponding to the adjusted spatial audio data to the audio headset, or any combination thereof.

Figure 14:
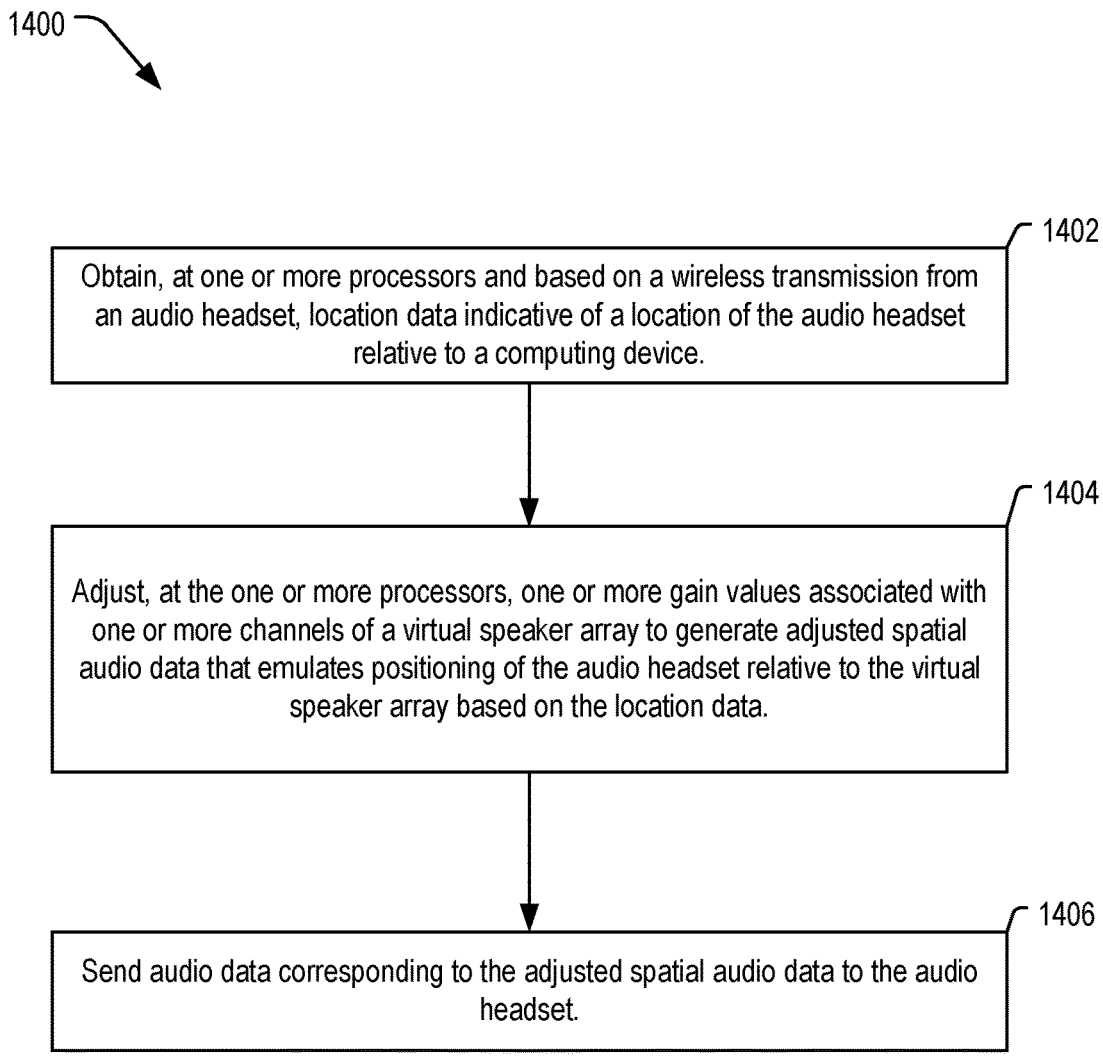
FIG. 14 is a flow chart of an example of a method for dynamic audio spatialization, in accordance with some examples of the present disclosure.

FIG. 14 is a flow chart of an example of a method 1400 for dynamic audio spatialization, in accordance with some examples of the present disclosure. The method 1400 may be initiated, performed, or controlled by one or more processors executing instructions, such as by the processor(s) 106 of FIG. 1 executing instructions 136 from the memory 108, the processor(s) 206 of FIG. 2 executing instructions 232 from the memory 208, or some combination thereof.

In some implementations, the method 1400 includes, at block 1402, obtaining, at one or more processors and based on a wireless transmission from an audio headset, location data indicative of a location of the audio headset relative to a computing device. For example, the processor(s) 106 of FIG. 1 obtain, based on the wireless transmission 124 from the audio headset 104, the location data 135 indicative of the location of the audio headset 104 relative to the device 102, such as described in more detail above with reference to the signal analyzer 112 of FIG. 1.

In the example of FIG. 14, the method 1400 includes, at block 1404, adjusting, at the one or more processors, one or more gain values associated with one or more channels of a virtual speaker array to generate adjusted spatial audio data that emulates positioning of the audio headset relative to the virtual speaker array based on the location data. For example, the processor(s) 106 of FIG. 1 adjusts one or more of the gain values 146 associated with one or more channels 138-142 of the virtual speaker array 134 to generate adjusted spatial audio that emulates positioning of the audio headset 104 relative to the virtual speaker array 134 based on the location data 135, as described in more detail above with reference to the spatial audio data generator 114 of FIG. 1.

In the example of FIG. 14, the method 1400 includes, at block 1406, sending audio data corresponding to the adjusted spatial audio data to the audio headset. For example, the processor(s) 106 of FIG. 1 send the audio data 122 corresponding to the adjusted spatial audio data 160 to the audio headset 104 via the modem 110, as described in more detail above with reference to FIG. 1.

Although the method 1400 is illustrated as including a certain number of operations, more, fewer, and/or different operations can be included in the method 1400 without departing from the scope of the subject disclosure. For example, the method 1400 can include obtaining the location data of the audio headset at a first time, modifying a reference point of a spatial audio field based on the audio headset remaining at a particular location for a period of time following the first time, the period of time exceeding a threshold duration, and updating an arrangement of the virtual speaker array based at least on the reference point of the spatial audio field. As an additional example, the method 1400 can vary depending on the number of audio headsets 104 coupled to the device 102.

In some implementations, the method 1400 can repeat the operations of one or more of blocks 1402-1406 periodically, occasionally, and/or continuously. For example, the method 1400 can obtain location data indicative of the location of the audio headset relative to the computing device periodically (e.g., every few milliseconds) to account for user movement. As an additional example, the method 1400 can include sending audio data corresponding to the adjusted spatial audio data to the audio headset continuously, in bursts, etc.

Further, although the examples provided above in illustrating method 1400 include the processor(s) 106 of FIG. 1 performing operations of the method 1400, some or all of the operations of the method 1400 can be performed by any suitable computing device.

Figure 15:
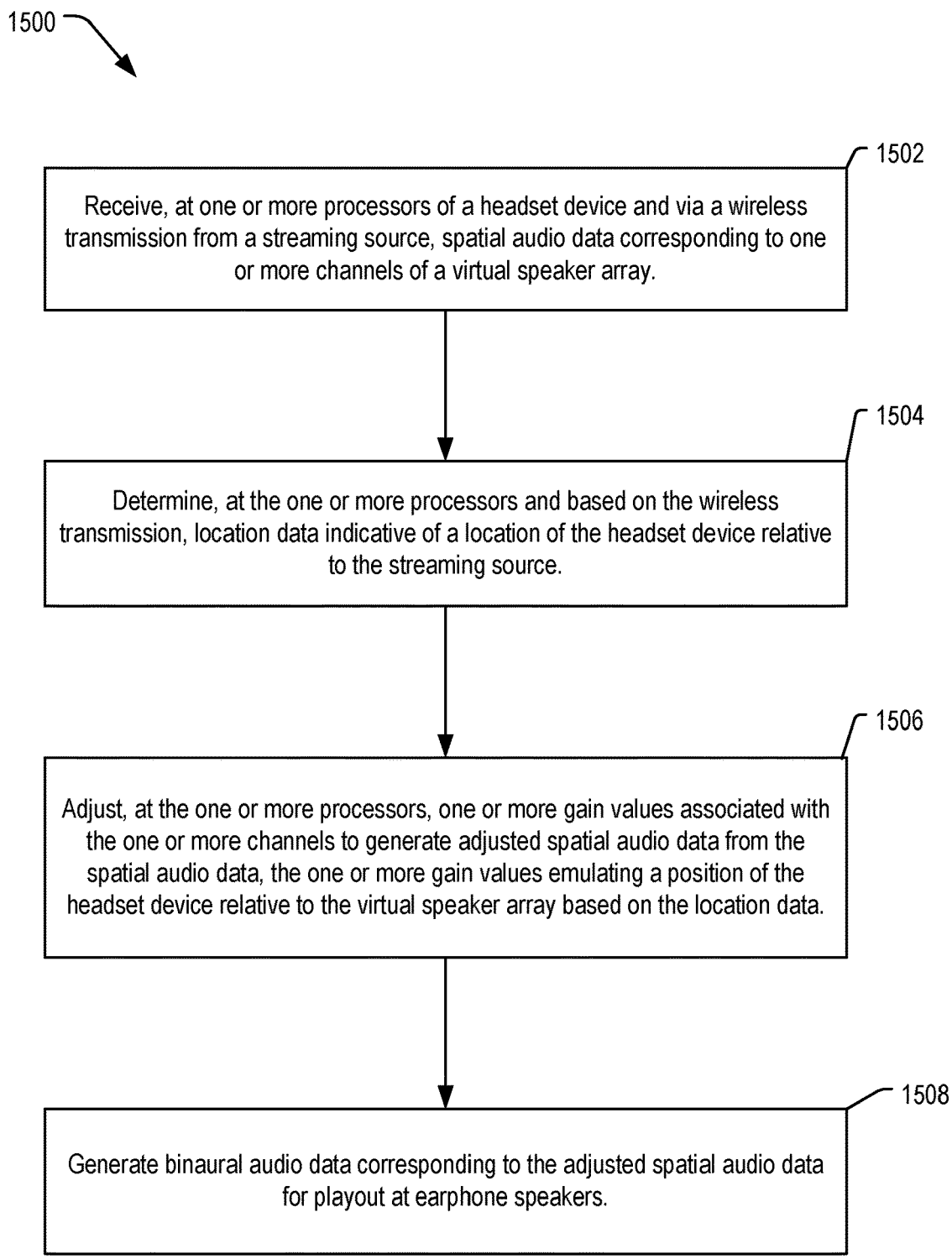
FIG. 15 is a flow chart of an example of another method for dynamic audio spatialization, in accordance with some examples of the present disclosure.

FIG. 15 is a flow chart of an example of another method 1500 for dynamic audio spatialization, in accordance with some examples of the present disclosure. The method 1500 may be initiated, performed, or controlled by one or more processors executing instructions, such as by the processor(s) 206 of the headset device 202 of FIG. 2 executing instructions 232 from the memory 208.

In some implementations, the method 1500 includes, at block 1502, receiving, at one or more processors of a headset device and via a wireless transmission from a streaming source, spatial audio data corresponding to one or more channels of a virtual speaker array. For example, the processor(s) 206 of the headset device 202 can receive via the spatial audio data 222, spatial audio data corresponding to one or more channels (e.g., the channels 138-142 of FIG. 1) of the virtual speaker array (e.g., the virtual speaker array 134 of FIG. 1).

In the example of FIG. 15, the method 1500 includes, at block 1504, determining, at the one or more processors and based on the wireless transmission, location data indicative of a location of the headset device relative to the streaming source. For example, the processor(s) 206 can determine the location data 135 based on the location data 235 indicative of the location of the headset device 202 relative to the streaming source 204.

In the example of FIG. 15, the method 1500 includes, at block 1506, adjusting, at the one or more processors, one or more gain values associated with the one or more channels to generate adjusted spatial audio data from the spatial audio data, the one or more gain values emulating a position of the headset device relative to the virtual speaker array based on the location data. For example, the processor(s) 206 can adjust the gain values 156 associated with the one or more channels (e.g., the channels 138-142 of FIG. 1) to generate the adjusted spatial audio from the spatial audio data 222, the one or more gain values 156 emulating a position (e.g., the location 158, 161 of FIG. 1) relative to the virtual speaker array (e.g., the virtual speaker array 134 of FIG. 1) based on the location data 135.

In the example of FIG. 15, the method 1500 includes, at block 1508, generating binaural audio data corresponding to the adjusted spatial audio data for playout at earphone speakers. For example, the processor(s) 206 can generate binaural audio data corresponding to the adjusted spatial audio data 160 for playout at speaker(s) 215.

Although the method 1500 is illustrated as including a certain number of operations, more, fewer, and/or different operations can be included in the method 1500 without departing from the scope of the subject disclosure. For example, the method 1500 can include determining the location data of the audio headset at a first time, modifying a reference point of a spatial audio field based on the audio headset remaining at a particular location for a period of time following the first time—the period of time exceeding a threshold duration, and updating an arrangement of the virtual speaker array based at least on the reference point of the spatial audio field. As an additional example, the method 1500 can vary depending on the number of streaming sources 204 coupled to the headset device 202.

In some implementations, the method 1500 can repeat the operations of one or more of blocks 1502-1506 periodically, occasionally, and/or continuously. For example, the method 1500 can determine location data indicative of the location of the audio headset relative to the computing device periodically (e.g., every few milliseconds) to account for user movement. As an additional example, the method 1500 can generate binaural audio date corresponding to the adjusted spatial audio data for playout at earphone speakers continuously, in bursts, etc.

Further, although the examples provided above in illustrating method 1500 include the processor(s) 206 of FIG. 1 performing operations of the method 1500, some or all of the operations of the method 1500 can be performed by any suitable computing device.

Further, the steps of a method or algorithm described in connection with the implementations disclosed herein, including the methods 1400, 1500, may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transient storage medium known in the art. An exemplary storage medium is coupled to the processor such that the processor may read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

Figure 16:
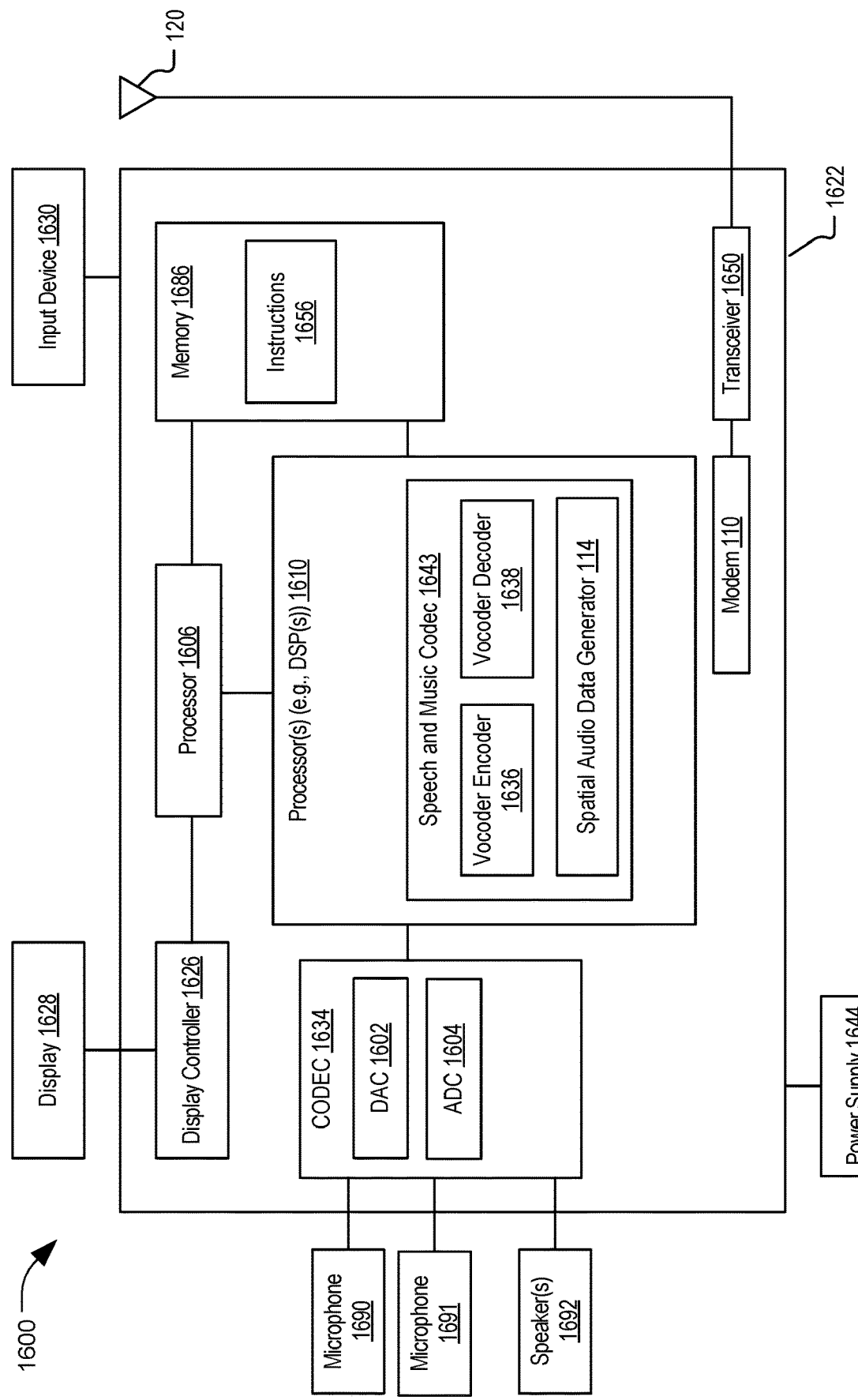
FIG. 16 is a block diagram illustrating a particular example of the device, in accordance with some examples of the subject disclosure.

Referring to FIG. 16, a block diagram of a particular illustrative implementation of a device is depicted and generally designated 1600. In various implementations, the device 1600 may have more or fewer components than illustrated in FIG. 16. In an illustrative implementation, the device 1600 may correspond to the device 102. In an illustrative implementation, the device 1600 may perform one or more operations described with reference to FIGS. 1-15.

In a particular implementation, the device 1600 includes a processor 1606 (e.g., a central processing unit (CPU)). The device 1600 may include one or more additional processors 1610 (e.g., one or more DSPs). In a particular aspect, one or more of the processor 106 of FIG. 1, the processor 128 of FIG. 1, the processor 206 of FIG. 2, or the processor 224 of FIG. 1 correspond to the processor 1606, the processors 1610, or a combination thereof. The processors 1610 may include a speech and music coder-decoder (CODEC) 1643 that includes a voice coder ("vocoder") encoder 1636, a vocoder decoder 1638, the spatial audio data generator 114, or a combination thereof.

The device 1600 may include a memory 1686 and a CODEC 1634. The memory 1686 may include instructions 1656, that are executable by the one or more additional processors 1610 (or the processor 1606) to implement the functionality described with reference to the spatial audio data generator 114. The device 1600 may include the modem 110 coupled, via a transceiver 1650, to the antenna 120. In a particular implementation, the transceiver 1650 can include a BLUETOOTH Low Energy-type transceiver, as described in more detail above with reference to FIGS. 1-2.

The device 1600 may include a display 1628 coupled to a display controller 1626. A speaker 1692, a first microphone 1690, and a second microphone 1691 may be coupled to the CODEC 1634. The CODEC 1634 may include a digital-to-analog converter (DAC) 1602, an analog-to-digital converter (ADC) 1604, or both. In a particular implementation, the CODEC 1634 may receive analog signals from the first microphone 1690 and the second microphone 1691, convert the analog signals to digital signals using the analog-to-digital converter 1604, and provide the digital signals to the speech and music codec 1608. The speech and music codec 1608 may process the digital signals, and the digital signals may further be processed by the processor(s) 1610. In a particular implementation, the speech and music codec 1643 may provide digital signals to the CODEC 1634. The CODEC 1634 may convert the digital signals to analog signals using the digital-to-analog converter 1602 and may provide the analog signals to the speaker(s) 1692.

In a particular implementation, the device 1600 may be included in a system-in-package or system-on-chip device 1622. In a particular implementation, the memory 1686, the processor 1606, the processors 1610, the display controller 1626, the CODEC 1634, and the modem 110 are included in the system-in-package or system-on-chip device 1622. In a particular implementation, an input device 1630 and a power supply 1644 are coupled to the system-in-package or the system-on-chip device 1622.

Moreover, in a particular implementation, as illustrated in FIG. 16, the display 1628, the input device 1630, the speaker(s) 1692, the first microphone 1690, the second microphone 1691, the antenna 120, and the power supply 1644 are external to the system-in-package or the system-on-chip device 1622. In a particular implementation, each of the display 1628, the input device 1630, the speaker(s) 1692, the first microphone 1690, the second microphone 1691, the antenna 120, and the power supply 1644 may be coupled to a component of the system-in-package or the system-on-chip device 1622, such as an interface (e.g., the wireless interface 132 of FIG. 1) or a controller.

The device 1600 may include a smart speaker, a speaker bar, a mobile communication device, a smart phone, a cellular phone, a laptop computer, a computer, a tablet, a personal digital assistant, a display device, a television, a gaming console, a music player, a radio, a digital video player, a digital video disc (DVD) player, a tuner, a camera, a navigation device, a vehicle, a headset, an augmented reality headset, a mixed reality headset, a virtual reality headset, an aerial vehicle, a home automation system, a voice-activated device, a wireless speaker and voice activated device, a portable electronic device, a car, a computing device, a communication device, an internet-of-things (IoT) device, a virtual reality (VR) device, a base station, a mobile device, or any combination thereof.

Those of skill would further appreciate that the various illustrative logical blocks, configurations, modules, circuits, and algorithm steps described in connection with the implementations disclosed herein may be implemented as electronic hardware, computer software executed by a processor, or combinations of both. Various illustrative components, blocks, configurations, modules, circuits, and steps have been described above generally in terms of their functionality. Whether such functionality is implemented as hardware or processor executable instructions depends upon the particular application and design constraints imposed on the overall system. Skilled artisans may implement the described functionality in varying ways for each particular application, such implementation decisions are not to be interpreted as causing a departure from the scope of the present disclosure.

Particular aspects of the disclosure are described below in a first set of interrelated examples:

According to Example 1, a device includes one or more processors configured to obtain, based on a wireless transmission from an audio headset, location data indicative of a location of the audio headset relative to the device; adjust one or more gain values associated with one or more channels of a virtual speaker array to generate adjusted spatial audio data that emulates positioning of the audio headset relative to the virtual speaker array based on the location data; and send audio data corresponding to the adjusted spatial audio data to the audio headset.

Example 2 includes the device of Example 1, wherein the audio data includes a binauralized version of the adjusted spatial audio data.

Example 3 includes the device of Example 1 or Example 2, wherein the audio data includes the adjusted spatial audio data.

Example 4 includes the device of any of Examples 1 to 3, wherein the location data includes angle data indicative of an angle of the audio headset relative to the device, the angle data including an angle of arrival of the wireless transmission from the audio headset to the device.

Example 5 includes the device of any of Examples 1 to 4, wherein the location data includes distance data indicative of a linear distance between the audio headset and the device, the distance data based at least on a signal strength measurement of the wireless transmission from the audio headset to the device.

Example 6 includes the device of any of Examples 1 to 5, wherein the location data is based on at least one of an angle of arrival or a received signal strength indicator obtained from a BLUETOOTH Low Energy-type receiver that receives the wireless transmission.

Example 7 includes the device of any of Examples 1 to 6, wherein the one or more processors are configured to obtain the location data of the audio headset at a first time; modify a reference point of a spatial audio field based on the audio headset remaining at a particular location for a period of time following the first time, the period of time exceeding a threshold duration; and update an arrangement of the virtual speaker array based at least on the reference point of the spatial audio field.

Example 8 includes the device of any of Examples 1 to 7 and further includes a modem coupled to the one or more processors, the modem configured to transmit the audio data to the audio headset.

Example 9 includes the device of any of Examples 1 to 8 and further includes an antenna array coupled to the one or more processors, the antenna array configured to receive the wireless transmission from the audio headset and to enable determination, by the one or more processors, of an angle of arrival of the wireless transmission.

Example 10 includes the device of any of Examples 1 to 9 and further includes a display device coupled to the one or more processors, the display device configured to output video corresponding to the audio data.

Example 11 includes the device of any of Examples 1 to 10, wherein the one or more processors are integrated in at least one of a mobile phone, a tablet computer device, or a wearable electronic device.

Example 12 includes the device of any of Examples 1 to 10, wherein the one or more processors are integrated in a television.

Example 13 includes the device of any of Examples 1 to 10, wherein the one or more processors are integrated in a vehicle.

According to Example 14, a method includes obtaining, at one or more processors and based on a wireless transmission from an audio headset, location data indicative of a location of the audio headset relative to a computing device; adjusting, at the one or more processors, one or more gain values associated with one or more channels of a virtual speaker array to generate adjusted spatial audio data that emulates positioning of the audio headset relative to the virtual speaker array based on the location data; and sending audio data corresponding to the adjusted spatial audio data to the audio headset.

Example 15 includes the method of Example 14, wherein the audio data includes a binauralized version of the adjusted spatial audio data.

Example 16 includes the method of Example 14 or Example 15, wherein the audio data includes the adjusted spatial audio data.

Example 17 includes the method of any of Examples 14 to 16, wherein the location data includes angle data indicative of an angle of the audio headset relative to the computing device, the angle data including an angle of arrival of the wireless transmission from the audio headset to the computing device.

Example 18 includes the method of any of Examples 14 to 17, wherein the location data includes distance data indicative of a linear distance between the audio headset and the computing device, the distance data based at least on a signal strength measurement of the wireless transmission from the audio headset to the computing device.

Example 19 includes the method of any of Examples 14 to 18, wherein the location data is based on at least one of an angle of arrival or a received signal strength indicator obtained from a BLUETOOTH Low Energy-type receiver that receives the wireless transmission.

Example 20 includes the method of any of Examples 14 to 19, and further includes receiving the location data from the audio headset at a first time; modifying a reference point of a spatial audio field based on the audio headset remaining at a particular location for a period of time following the first time, the period of time exceeding a threshold duration; and updating an arrangement of the virtual speaker array based at least on the reference point of the spatial audio field.

According to Example 21, a headset device includes one or more processors configured to determine location data indicative of a location of the headset device relative to a streaming source; receive spatial audio data from the streaming source; adjust one or more gain values associated with one or more channels of a virtual speaker array to generate adjusted spatial audio data from the spatial audio data, the one or more gain values emulating a position of the headset device relative to the virtual speaker array based on the location data; and generate binaural audio data corresponding to the adjusted spatial audio data for playout at earphone speakers.

Example 22 includes the headset device of Example 21, wherein the location data includes angle data indicative of an angle of the headset device relative to the streaming source, the angle data including an angle of arrival of a wireless transmission from the headset device to the streaming source.

Example 23 includes the headset device of Example 21 or Example 22, wherein the location data includes distance data indicative of a linear distance between the headset device and the streaming source, the distance data based at least on a signal strength measurement of a wireless transmission from the headset device to the streaming source.

Example 24 includes the headset device of any of Examples 21 to 23, wherein the location data is based on at least one of an angle of arrival or a received signal strength indicator obtained from a BLUETOOTH Low Energy-type receiver that receives a wireless transmission from the headset device to the streaming source.

Example 25 includes the headset device of any of Examples 21 to 24, wherein the one or more processors are configured to determine the location data at a first time; modify a reference point of a spatial audio field based on the headset device remaining at a particular location for a period of time following the first time, the period of time exceeding a threshold duration; and update an arrangement of the virtual speaker array based at least on the reference point of the spatial audio field.

Example 26 includes the headset device of any of Examples 21 to 25 and further includes a modem coupled to the one or more processors, the modem configured to receive the spatial audio data from the streaming source.

Example 27 includes the headset device of any of Examples 21 to 26 and further includes the earphone speakers coupled to the one or more processors and configured to output the binaural audio data.

According to Example 28, a method includes receiving, at one or more processors of a headset device and via a wireless transmission from a streaming source, spatial audio data corresponding to one or more channels of a virtual speaker array; determining, at the one or more processors and based on the wireless transmission, location data indicative of a location of the headset device relative to the streaming source; adjusting, at the one or more processors, one or more gain values associated with the one or more channels to generate adjusted spatial audio data from the spatial audio data, the one or more gain values emulating a position of the headset device relative to the virtual speaker array based on the location data; and generating binaural audio data corresponding to the adjusted spatial audio data for playout at earphone speakers.

Example 29 includes the method of Example 28, wherein the location data is based on at least one of an angle of arrival or a received signal strength indicator obtained from a BLUETOOTH Low Energy-type receiver that receives the wireless transmission.

Example 30 includes the method of Example 28 or Example 29, and further includes determining the location data at a first time; modifying a reference point of a spatial audio field based on the headset device remaining at a particular location for a period of time following the first time, the period of time exceeding a threshold duration; and updating an arrangement of the virtual speaker array based at least on the reference point of the spatial audio field.

According to Example 31, a non-transient, computer readable medium stores instructions that, when executed by a processor, cause the processor to obtain, based on a wireless transmission from an audio headset, location data indicative of a location of the audio headset relative to the device. The instructions, when executed by the processor, also cause the processor to adjust one or more gain values associated with one or more channels of a virtual speaker array to generate adjusted spatial audio data that emulates positioning of the audio headset relative to the virtual speaker array based on the location data. The instructions, when executed by the processor, also cause the processor to send audio data corresponding to the adjusted spatial audio data to the audio headset.

Example 32 includes the non-transient, computer readable medium of Example 31, wherein the audio data includes a binauralized version of the adjusted spatial audio data.

Example 33 includes the non-transient, computer readable medium of Example 31 or Example 32, wherein the audio data includes the adjusted spatial audio data.

Example 34 includes the non-transient, computer readable medium of any of Examples 31 to 33, wherein the location data includes angle data indicative of an angle of the audio headset relative to the non-transient, computer readable medium, the angle data including an angle of arrival of the wireless transmission from the audio headset to the non-transient, computer readable medium.

Example 35 includes the non-transient, computer readable medium of any of Examples 31 to 34, wherein the location data includes distance data indicative of a linear distance between the audio headset and the non-transient, computer readable medium, the distance data based at least on a signal strength measurement of the wireless transmission from the audio headset to the non-transient, computer readable medium.

Example 36 includes the non-transient, computer readable medium of any of Examples 31 to 35, wherein the location data is based on at least one of an angle of arrival or a received signal strength indicator obtained from a Bluetooth Low Energy-type receiver that receives the wireless transmission.

Example 37 includes the non-transient, computer readable medium of any of Examples 31 to 36, wherein the instructions, when executed by the processor, further cause the processor to obtain the location data of the audio headset at a first time. The instructions, when executed by the processor, also cause the processor to modify a reference point of a spatial audio field based on the audio headset remaining at a particular location for a period of time following the first time, the period of time exceeding a threshold duration. The instructions, when executed by the processor, also cause the processor to update an arrangement of the virtual speaker array based at least on the reference point of the spatial audio field.

According to Example 38, a device includes means for obtaining, at one or more processors and based on a wireless transmission from an audio headset, location data indicative of a location of the audio headset relative to a computing device. The device also includes means for adjusting, at the one or more processors, one or more gain values associated with one or more channels of a virtual speaker array to generate adjusted spatial audio data that emulates positioning of the audio headset relative to the virtual speaker array based on the location data. The device also includes means for sending audio data corresponding to the adjusted spatial audio data to the audio headset.

Example 39 includes the device of Example 38, wherein the audio data includes a binauralized version of the adjusted spatial audio data.

Example 40 includes the device of Example 38 or Example 39, wherein the audio data includes the adjusted spatial audio data.

Example 41 includes the devices of any of Examples 38 to 40, wherein the location data includes angle data indicative of an angle of the audio headset relative to the computing device, the angle data including an angle of arrival of the wireless transmission from the audio headset to the computing device.

Example 42 includes the device of any of Examples 38 to 41, wherein the location data includes distance data indicative of a linear distance between the audio headset and the computing device, the distance data based at least on a signal strength measurement of the wireless transmission from the audio headset to the computing device.

Example 43 includes the device of any of Examples 38 to 42, wherein the location data is based on at least one of an angle of arrival or a received signal strength indicator obtained from a Bluetooth Low Energy-type receiver that receives the wireless transmission.

Example 44 includes the device of any of Examples 38 to 43, wherein the device also includes means for receiving the location data from the audio headset at a first time. The device also includes means for modifying a reference point of a spatial audio field based on the audio headset remaining at a particular location for a period of time following the first time, the period of time exceeding a threshold duration. The device also includes means for updating an arrangement of the virtual speaker array based at least on the reference point of the spatial audio field.

According to Example 45, a non-transient, computer-readable medium stores instructions that, when executed by a processor, cause the processor to determine location data indicative of a location of the headset device relative to a streaming source. The instructions, when executed by the processor, also cause the processor to receive spatial audio data from the streaming source. The instructions, when executed by the processor, also cause the processor to adjust one or more gain values associated with one or more channels of a virtual speaker array to generate adjusted spatial audio data from the spatial audio data, the one or more gain values emulating a position of the headset device relative to the virtual speaker array based on the location data. The instructions, when executed by the processor, also cause the processor to generate binaural audio data corresponding to the adjusted spatial audio data for playout at earphone speakers.

Example 46 includes the non-transient, computer readable medium of Example 45, wherein the location data includes angle data indicative of an angle of the headset device relative to the streaming source, the angle data including an angle of arrival of a wireless transmission from the headset device to the streaming source.

Example 47 includes the non-transient, computer readable medium of Example 45 or Example 46, wherein the location data includes distance data indicative of a linear distance between the headset device and the streaming source, the distance data based at least on a signal strength measurement of a wireless transmission from the headset device to the streaming source.

Example 48 includes the non-transient, computer readable medium of any of Examples 45 to 47, wherein the location data is based on at least one of an angle of arrival or a received signal strength indicator obtained from a Bluetooth Low Energy-type receiver that receives a wireless transmission from the headset device to the streaming source.

Example 49 includes the non-transient, computer readable medium of any of Examples 45 to 48, wherein the instructions, when executed by the processor, also cause the processor to determine the location data at a first time. The instructions, when executed by the processor, also cause the processor to modify a reference point of a spatial audio field based on the headset device remaining at a particular location for a period of time following the first time, the period of time exceeding a threshold duration. The instructions, when executed by the processor, also cause the processor to update an arrangement of the virtual speaker array based at least on the reference point of the spatial audio field.

According to Example 50, a device includes means for receiving, at one or more processors of a headset device and via a wireless transmission from a streaming source, spatial audio data corresponding to one or more channels of a virtual speaker array. The device also includes means for determining, at the one or more processors and based on the wireless transmission, location data indicative of a location of the headset device relative to the streaming source. The device also includes means for adjusting, at the one or more processors, one or more gain values associated with the one or more channels to generate adjusted spatial audio data from the spatial audio data, the one or more gain values emulating a position of the headset device relative to the virtual speaker array based on the location data. The device also includes means for generating binaural audio data corresponding to the adjusted spatial audio data for playout at earphone speakers.

Example 51 includes the device of Example 50, wherein the location data is based on at least one of an angle of arrival or a received signal strength indicator obtained from a Bluetooth Low Energy-type receiver that receives the wireless transmission.

Example 52 includes the device of Example 50 or Example 51, wherein the device also includes means for determining the location data at a first time. The device also includes means for modifying a reference point of a spatial audio field based on the headset device remaining at a particular location for a period of time following the first time, the period of time exceeding a threshold duration. The device also includes means for updating an arrangement of the virtual speaker array based at least on the reference point of the spatial audio field.

The previous description of the disclosed aspects is provided to enable a person skilled in the art to make or use the disclosed aspects. Various modifications to these aspects will be readily apparent to those skilled in the art, and the principles defined herein may be applied to other aspects without departing from the scope of the disclosure. Thus, the present disclosure is not intended to be limited to the aspects shown herein but is to be accorded the widest scope possible consistent with the principles and novel features as defined by the following claims.

What is claimed is:

1. A device comprising:
   one or more processors configured to:
   obtain, based on a wireless transmission from an audio headset, location data indicative of a location of the audio headset relative to the device;
   adjust one or more gain values associated with one or more channels of a virtual speaker array to generate adjusted spatial audio data that emulates positioning of the audio headset relative to the virtual speaker array based on the location data;
   send audio data corresponding to the adjusted spatial audio data to the audio headset;
   obtain the location data of the audio headset at a first time;
   modify a reference point of a spatial audio field based on the audio headset remaining at a particular location for a period of time following the first time, the period of time exceeding a threshold duration; and
   update an arrangement of the virtual speaker array based at least on the reference point of the spatial audio field.

2. The device of claim 1, wherein the audio data includes a binauralized version of the adjusted spatial audio data.

3. The device of claim 1, wherein the audio data includes the adjusted spatial audio data.

4. The device of claim 1, wherein the location data includes angle data indicative of an angle of the audio headset relative to the device, the angle data including an angle of arrival of the wireless transmission from the audio headset to the device.

5. The device of claim 1, wherein the location data includes distance data indicative of a linear distance between the audio headset and the device, the distance data based at least on a signal strength measurement of the wireless transmission from the audio headset to the device.

6. The device of claim 1, wherein the location data is based on at least one of an angle of arrival or a received signal strength indicator obtained from a BLUETOOTH Low Energy-type receiver that receives the wireless transmission.

7. The device of claim 1, further comprising a modem coupled to the one or more processors, the modem configured to transmit the audio data to the audio headset.

8. The device of claim 1, further comprising an antenna array coupled to the one or more processors, the antenna array configured to receive the wireless transmission from the audio headset and to enable determination, by the one or more processors, of an angle of arrival of the wireless transmission.

9. The device of claim 1, further comprising a display device coupled to the one or more processors, the display device configured to output video corresponding to the audio data.

10. The device of claim 1, wherein the one or more processors are integrated in at least one of a mobile phone, a tablet computer device, or a wearable electronic device.

11. The device of claim 1, wherein the one or more processors are integrated in a television.

12. The device of claim 1, further comprising a camera coupled to the one or more processors, the camera configured to identify an orientation of a user of the device, and wherein the one or more processors are further configured to generate orientation data indicative of an orientation of the audio headset relative to the device, the orientation data based at least on the orientation of the user of the device.

13. The device of claim 1, wherein the one or more processors are integrated in a vehicle.

14. A method comprising:
   obtaining, at one or more processors and based on a wireless transmission from an audio headset, location data indicative of a location of the audio headset relative to a computing device;
   adjusting, at the one or more processors, one or more gain values associated with one or more channels of a virtual speaker array to generate adjusted spatial audio data that emulates positioning of the audio headset relative to the virtual speaker array based on the location data;
   sending audio data corresponding to the adjusted spatial audio data to the audio headset;
   receiving the location data from the audio headset at a first time;
   modifying a reference point of a spatial audio field based on the audio headset remaining at a particular location for a period of time following the first time, the period of time exceeding a threshold duration; and
   updating an arrangement of the virtual speaker array based at least on the reference point of the spatial audio field.

15. The method of claim 14, wherein the audio data includes a binauralized version of the adjusted spatial audio data.

16. The method of claim 14, wherein the audio data includes the adjusted spatial audio data.

17. The method of claim 14, wherein the location data includes angle data indicative of an angle of the audio headset relative to the computing device, the angle data including an angle of arrival of the wireless transmission from the audio headset to the computing device.

18. The method of claim 14, wherein the location data includes distance data indicative of a linear distance between the audio headset and the computing device, the distance data based at least on a signal strength measurement of the wireless transmission from the audio headset to the computing device.

19. The method of claim 14, wherein the location data is based on at least one of an angle of arrival or a received signal strength indicator obtained from a BLUETOOTH Low Energy-type receiver that receives the wireless transmission.

20. A headset device comprising:
   one or more processors configured to:
   determine location data indicative of a location of the headset device relative to a streaming source;

receive spatial audio data from the streaming source;

adjust one or more gain values associated with one or more channels of a virtual speaker array to generate adjusted spatial audio data from the spatial audio data, the one or more gain values emulating a position of the headset device relative to the virtual speaker array based on the location data;

generate binaural audio data corresponding to the adjusted spatial audio data for playout at earphone speakers;

determine the location data at a first time;

modify a reference point of a spatial audio field based on the headset device remaining at a particular location for a period of time following the first time, the period of time exceeding a threshold duration; and update an arrangement of the virtual speaker array based at least on the reference point of the spatial audio field.

21. The headset device of claim 20, wherein the location data includes angle data indicative of an angle of the headset device relative to the streaming source, the angle data including an angle of arrival of a wireless transmission from the headset device to the streaming source.

22. The headset device of claim 20, wherein the location data includes distance data indicative of a linear distance between the headset device and the streaming source, the distance data based at least on a signal strength measurement of a wireless transmission from the headset device to the streaming source.

23. The headset device of claim 20, wherein the location data is based on at least one of an angle of arrival or a received signal strength indicator obtained from a BLUETOOTH Low Energy-type receiver that receives a wireless transmission from the headset device to the streaming source.

24. The headset device of claim 20, further comprising an antenna array coupled to the one or more processors, the antenna array configured to receive a wireless transmission from the streaming source and to enable determination, by the one or more processors, of an angle of arrival of the wireless transmission.

25. The headset device of claim 20, further comprising a modem coupled to the one or more processors, the modem configured to receive the spatial audio data from the streaming source.

26. The headset device of claim 20, further comprising the earphone speakers coupled to the one or more processors and configured to output the binaural audio data.

27. A method comprising:
receiving, at one or more processors of a headset device and via a wireless transmission from a streaming source, spatial audio data corresponding to one or more channels of a virtual speaker array;

determining, at the one or more processors and based on the wireless transmission, location data indicative of a location of the headset device relative to the streaming source;

adjusting, at the one or more processors, one or more gain values associated with the one or more channels to generate adjusted spatial audio data from the spatial audio data, the one or more gain values emulating a position of the headset device relative to the virtual speaker array based on the location data;

generating binaural audio data corresponding to the adjusted spatial audio data for playout at earphone speakers;

determining the location data of the headset device at a first time;

modifying a reference point of a spatial audio field based on the headset device remaining at a particular location for a period of time following the first time, the period of time exceeding a threshold duration; and updating an arrangement of the virtual speaker array based at least on the reference point of the spatial audio field.

28. The method of claim 27, wherein the location data is based on at least one of an angle of arrival or a received signal strength indicator obtained from a BLUETOOTH Low Energy-type receiver that receives the wireless transmission.

29. The method of claim 27, wherein the location data includes angle data indicative of an angle of the headset device relative to the streaming source, the angle data including an angle of arrival of the wireless transmission from the headset device to the streaming source.

30. The method of claim 27, wherein the location data includes distance data indicative of a linear distance between the headset device and the streaming source, the distance data based at least on a signal strength measurement of the wireless transmission from the headset device to the streaming source.

* * * * *